US011145290B2

(12) United States Patent
Kim et al.

(10) Patent No.: US 11,145,290 B2
(45) Date of Patent: Oct. 12, 2021

(54) SYSTEM INCLUDING ELECTRONIC DEVICE OF PROCESSING USER'S SPEECH AND METHOD OF CONTROLLING SPEECH RECOGNITION ON ELECTRONIC DEVICE

(71) Applicant: Samsung Electronics Co., Ltd., Gyeonggi-do (KR)

(72) Inventors: Jooyoo Kim, Gyeonggi-do (KR); Jaepil Kim, Gyeonggi-do (KR); Seongmin Je, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 181 days.

(21) Appl. No.: 16/419,250

(22) Filed: May 22, 2019

(65) Prior Publication Data

US 2019/0362706 A1    Nov. 28, 2019

(30) Foreign Application Priority Data

May 24, 2018   (KR) .................... 10-2018-0059305

(51) Int. Cl.
*G10L 15/02*    (2006.01)
*G10L 15/22*    (2006.01)

(52) U.S. Cl.
CPC .............. *G10L 15/02* (2013.01); *G10L 15/22* (2013.01); *G10L 2015/223* (2013.01)

(58) Field of Classification Search
CPC .... G10L 15/22; G10L 15/02; G10L 2015/223
USPC ........................................................ 704/254
See application file for complete search history.

(56) References Cited

U.S. PATENT DOCUMENTS

| 9,972,318 | B1 | 5/2018 | Kelly et al. |
| 2010/0312547 | A1 | 12/2010 | Van Os et al. |
| 2014/0067376 | A1 | 3/2014 | Delefevre |
| 2016/0217124 | A1 | 7/2016 | Sarikaya et al. |
| 2016/0217672 | A1* | 7/2016 | Yoon .................. A61B 5/02055 |

(Continued)

FOREIGN PATENT DOCUMENTS

| KR | 10-2016-0059026 A | 5/2016 | |
| WO | WO-2017156640 A1 * | 9/2017 | ......... G10L 15/1815 |

OTHER PUBLICATIONS

European Search Report dated Jul. 10, 2019.
International Search Report dated Sep. 6, 2019.

*Primary Examiner* — Bharatkumar S Shah
(74) *Attorney, Agent, or Firm* — Cha & Reiter, LLC

(57) ABSTRACT

Provided is a system including an electronic device to recognize and process a user's speech and a method of controlling speech recognition on an electronic device. According to an embodiment, an electronic device comprises a communication circuit, an input module, at least one processor, and a memory operatively connected with the at least one processor the input module, and the communication circuit, wherein the memory stores instructions configured to enable the at least one processor to provide a function according to a first utterance of a user for wake-up, receive a second utterance of the user including a plurality of words with predesignated relevance through the input module while the function is provided, transmit information about the second utterance of the user, to another electronic device via the communication circuit, and receive a response related to the second utterance of the user from the second electronic device according to the transmission and provide the received response.

20 Claims, 24 Drawing Sheets

(56) References Cited

U.S. PATENT DOCUMENTS

| | | |
|---|---|---|
| 2017/0133010 A1 | 5/2017 | Printz |
| 2017/0178626 A1 | 6/2017 | Gruber et al. |
| 2017/0193997 A1* | 7/2017 | Chen .................. G10L 13/08 |
| 2017/0270929 A1 | 9/2017 | Aleksic et al. |
| 2019/0287526 A1* | 9/2019 | Ren .................... G10L 15/18 |

* cited by examiner

SAVE 120 SYSTOLIC AND 80 DIASTOLIC
BPHighNumber       BPLowNumber
    ⎞                  ⎞
   1105               1106

FIG.11D

START 5 KILOMETER RUNNING PROGRAM
      ProgramName
          ⎞
         1107

5 KILOMETER RUNNING
Distance  Unit    Event
   ⎞       ⎞       ⎞
 1107a   1107b   1107c

FIG.11E

SYSTEM INCLUDING ELECTRONIC DEVICE OF PROCESSING USER'S SPEECH AND METHOD OF CONTROLLING SPEECH RECOGNITION ON ELECTRONIC DEVICE

CROSS-REFERENCE TO RELATED APPLICATION(S)

This application is based on and claims priority under 35 U.S.C. 119 to Korean Patent Application No. 10-2018-0059305, filed on May 24, 2018, in the Korean Intellectual Property Office, the disclosure of which is herein incorporated by reference in its entirety.

BACKGROUND

Field

The disclosure relates to systems including an electronic device of processing a user's speech (or a user's voice) and methods of controlling speech recognition on an electronic device.

Description of Related Art

Voice control of electronic device allows a user to operate the electronic device using speech that is common in human interactions. This also allows the user to operate the device without using their hands, and manipulating cumbersome interfaces. However, properly interpreting voice commands can be challenging.

The above information is presented as background information only to assist with an understanding of the disclosure. No determination has been made, and no assertion is made, as to whether any of the above might be applicable as prior art with regard to the disclosure.

SUMMARY

According to an embodiment, an electronic device comprises a communication circuit, an input module, at least one processor, and a memory operatively connected with the at least one processor the input module, and the communication circuit, wherein the memory stores instructions configured to enable the at least one processor to provide a function according to a first utterance of a user for wake-up, receive a second utterance of the user including a plurality of words with predesignated relevance through the input module while the function is provided, transmit information about the second utterance of the user, to another electronic device via the communication circuit, and receive a response related to the second utterance of the user from the second electronic device according to the transmission and provide the received response. According to an embodiment, a method comprises providing function by a first electronic device according to a first utterance of a user to wake-up; receiving a second utterance of the user including a plurality of words with predesignated relevance through an input module of the first electronic device while the function is provided by the first electronic device; transmitting information about the second utterance of user, to a second electronic device via a communication circuit of the first electronic device; and receiving a response related to the second utterance of user from the second electronic device in response to the transmission and providing the received response.

According to an embodiment, a computer-readable recording medium storing instructions configured to perform at least one operation by a processor, the at least one operation comprising providing a function according to a first utterance of a user for wake-up; receiving a second utterance of the user including a plurality of words with predesignated relevance through an input module of an electronic device while the function is provided through the electronic device; transmitting information about the second utterance of user, to another electronic device via a communication circuit of the electronic device; and receiving a response related to the second utterance of user from the another electronic device in response to the transmission and providing the received response.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein:

FIG. 11A, FIG. 11B, FIG. 11C, FIG. 11D, and FIG. 11E are views illustrating example operations of selecting a word contained in a user's utterance by an intelligent server according to an embodiment;

Throughout the drawings, like reference numerals will be understood to refer to like parts, components, and structures.

DETAILED DESCRIPTION

Figure 1:
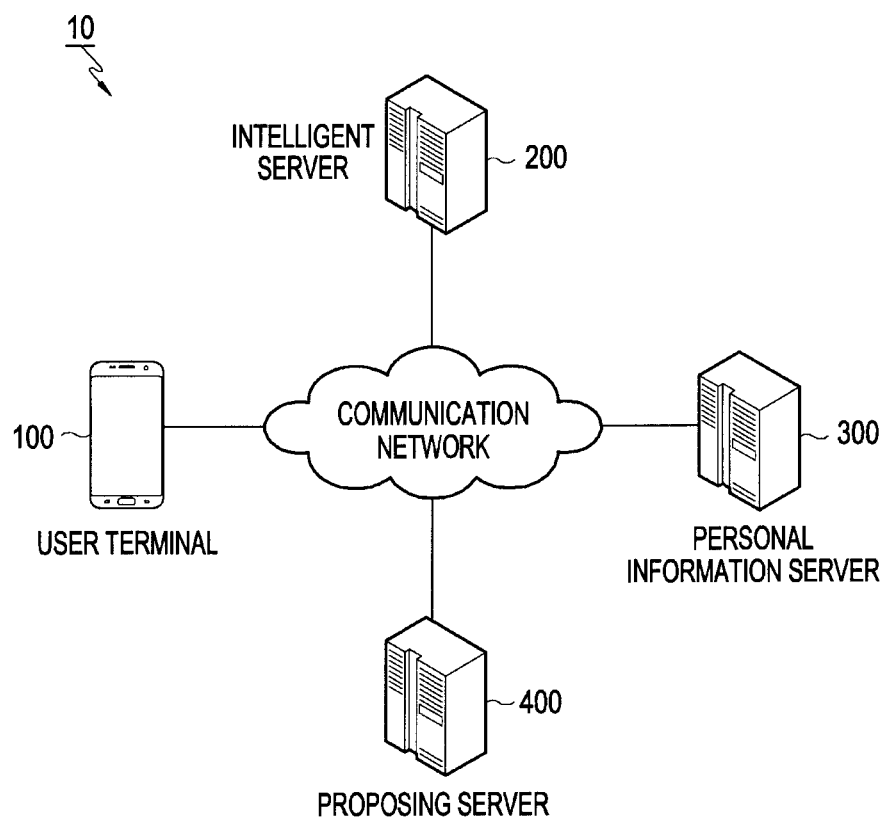
FIG. 1 is a view illustrating an integrated intelligence system according to an embodiment.

More and more services and functions are being provided through electronic devices, e.g., smartphones or other portable electronic devices. Voice control can ease operation of the electronic devices by replacing cumbersome user interfaces with more natural human speech commands.

For example, speech recognition-based control technology may analyze a speech (command) received through the user's utterance and provide a service most consistent with the user's request (or command). Such technology allows for easier control of electronic devices as compared with the user's manipulation using physical or mechanical buttons on the electronic device or using an additional input device, e.g., mouse or keyboard, or a user interface displayed on a touch-recognizable display and is thus coming in wide use.

A user may enter an utterance into an electronic device (e.g., a smartphone) included in an integrated intelligence system. When the user's utterance contains a plurality of words corresponding to one parameter, an intelligent server included in the integrated intelligence system may fail to process the user's utterance as the user has intended. For example, when the user enters the utterance "I ate a banana and an apple for breakfast. Save it," to a user terminal, the utterance contains two words corresponding to a particular parameter (e.g., kind of food) and the intelligent server may thus determine (or extract or map) only one word such as "banana" or "apple" corresponding to the particular parameter. Thus, the intelligent server may be unable to perform utterance processing consistent with the user's intent (e.g., generate or select operation information (e.g., a path rule) to provide (or perform) a task consistent with the user's intent).

When the user's utterance contains a plurality of words each corresponding to a respective one of a plurality of parameters (e.g., kind of food and amount of food), the intelligent server may fail to process the user's utterance as the user has intended. For example, when the user terminal receives the user's utterance "I ate one apple and one bowl of soybean soup for breakfast," the intelligent server may individually process all of the words, i.e., "apple (parameter: kind of food)," "one (parameter: amount of food)," "soybean soup (parameter: kind of food), and "one bowl (parameter: amount of food)", contained in the utterance and may thus fail to consider the linking relation (i.e., "apple↔one", "soybean soup"↔"one bowl") between words that the user has intended with the utterance. Or, the intelligent server may understand (e.g., process) the user's utterance "I ate one apple and one bowl of soybean soup for breakfast. Save it" as, e.g., "I ate apple soybean soup and one and one bowl for breakfast." As such, the intelligent server may fail to perform utterance processing consistent with the user's utterance.

Further, the intelligent server may merely process the user's utterance in "word units" but might not process in "semantic units" (this term may be interchangeably used with "semantic group" for ease of description throughout the specification). Thus, when a mandatory word (or a mandatory parameter) necessary to identify the user's intent from the user's utterance or generate operation information according to the user's intent is missing from the user's utterance, an operation of requesting to enter the missing word may not be carried out. For example, when the user terminal receives the user's utterance "I ate one bowl of soybean soup and one apple for breakfast. Save it," the intelligent server may fail to process the user's utterance in semantic units (e.g., a first semantic group: [soybean soup, one bowl], a second semantic group: [apple, one]) and end up identifying the user's intent or generating operation information, with the mandatory words "soybean soup" missing from the user's utterance. As such, the intelligent server may end up with failure to perform utterance processing consistent with the user's utterance. As used herein, the term "mandatory word" may be used with the same meaning as "mandatory parameter" (e.g., the terms may denote the same target or object).

Certain embodiments of the present disclosure may address the foregoing situations.

According to an embodiment, there may be provided a system including an electronic device (e.g., an intelligent server) capable of producing operation information for performing a task consistent with the user's intent although the user's utterance contains a plurality of words corresponding to a particular parameter (e.g., kind of food).

According to an embodiment, there may be provided a system including an electronic device (e.g., a user terminal) capable of providing a task consistent with the user's intent although the user's utterance contains a plurality of words corresponding to a particular parameter (e.g., kind of food).

According to an embodiment, there may be provided a system including an electronic device (e.g., a user terminal or an intelligent server) capable of notifying the user of the missing of a mandatory word necessary to provide a task requested through the user's utterance or to identify the user's intent by processing the user's utterance in semantic units.

According to an embodiment, there may be provided a method of controlling an electronic device (e.g., an intelligent server) capable of producing operation information for performing a task consistent with the user's intent although the user's utterance contains a plurality of words corresponding to a particular parameter (e.g., kind of food).

According to an embodiment, there may be provided a method of controlling an electronic device (e.g., a user terminal) capable of providing a task consistent with the user's intent although the user's utterance contains a plurality of words corresponding to a particular parameter (e.g., kind of food).

According to an embodiment, there may be provided a method of controlling an electronic device (e.g., a user terminal or an intelligent server) capable of notifying the user of the missing of a mandatory word necessary to provide a task requested through the user's utterance or to identify the user's intent by processing the user's utterance in semantic units.

FIG. 1 is a view illustrating an example of an integrated intelligence system according to an embodiment. In certain embodiments, the integrated intelligence system can comprise an electronic device, such as a smartphone.

Referring to FIG. 1, an integrated intelligence system 10 may include a user terminal 100, an intelligent server 200, a personal information server 300, or a proposal server 400. The user terminal 100 may receive a user utterance and provide the utterance to the intelligent server 200. The personal information server 300 stores information about past user behavior. The proposal server 400 provides information about different applications that are available in the user terminal. The intelligent server 200 the information from the personal information server 300 and the proposal server 400 to determine a function to perform.

According to an embodiment, the user terminal 100 may provide services necessary for the user through an app (or application program) (e.g., an alarm app, message app, photo (Gallery) app, etc.) stored in the user terminal 100. For example, according to an embodiment, the user terminal 100 may execute and operate another app through an intelligent app (or speech recognition app) stored in the user terminal 100. The intelligent app of the user terminal 100 may receive user inputs to execute and operate the other app through the intelligent app. An intelligent app can comprise application(s) that use past and real-time data from user interactions to make predictions and/or suggestions, to deliver adaptive user experiences. The user inputs may be received through, e.g., a physical button, touchpad, speech input by a microphone, or remote input. The user terminal 100 may be various terminal devices (or electronic devices) connectable to the internet, such as a cellular phone, smartphone, personal digital assistant (PDA), or laptop computer.

According to an embodiment, the user terminal 100 may receive a user utterance as a user input. The user terminal 100 may receive the user utterance and generate a command to operate the app based on the user utterance. Accordingly, the user terminal 100 may operate the app using the command.

According to an embodiment, the intelligent server 200 may receive the user's speech input (or user's voice input) from the user terminal 100 through a communication network (such as the Internet) and convert the speech input into text data. The intelligent server 200 may generate (or select) a path rule based on the text data. The path rule may include information about actions (or operations) to perform the functions of the app or information about parameters necessary to execute the operations. The path rule may include the order of the operations of the app. The user terminal 100 may receive the path rule, select an app according to the path rule, and execute the operations included in the path rule on the selected app.

As used herein, the term "path rule" may generally mean a sequence of states for the electronic device to provide a task requested by the user, but not limited thereto. In other words, the path rule may contain information about a sequence, according to an embodiment. The task may be a certain action that, e.g., an intelligent app may provide. The task may include producing a schedule, transmitting a photo to a desired party, or providing weather information. The user terminal 100 may provide the task by sequentially having at least one or more states (e.g., operation states of the user terminal 100).

According to an embodiment, the path rule may be provided or created by an artificial intelligence (AI) system. The AI system may be a rule-based system or a neural network-based system (e.g., feedforward neural network (FNN)) or recurrent neutral network (RNN)). Or, the AI system may be a combination thereof or a system different therefrom. The path rule may be selected from a set of pre-defined path rules or created in real-time in response to a user request. For example, the AI system may select at least one among a plurality of pre-defined path rules or may dynamically (or in real-time) create a path rule. According to an embodiment, the user terminal 100 may use a hybrid system to provide the path rule.

According to an embodiment, the user terminal 100 may execute the operation and display, on the display, the screen corresponding to the state of the user terminal 100 having performed the operation. The user terminal 100 may execute the operation and abstain from displaying the results of performing the operation on the display. The user terminal 100 may execute, e.g., a plurality of operations and display, on the display, only some results of the plurality of operations. The user terminal 100 may display, on the display, e.g., the results of executing only the last operation in order. As another example, the user terminal 100 may receive a user input and display the results of executing the operation on the display, according to an embodiment.

According to an embodiment, the personal information server 300 may include a database storing user information. For example, according to an embodiment, the personal information server 300 may receive user information (e.g., context information or app execution) from the user terminal 100 and store the user information in the database. The intelligent server 200 may receive the user information from the personal information server 300 through the communication network and use the same in creating a path rule for user inputs. According to an embodiment, the user terminal 100 may receive user information from the personal information server 300 through the communication network and use the same as information for managing the database.

According to an embodiment, the proposal server 400 may include a database that stores information about functions to be provided or introductions of applications or functions in the terminal. For example, according to an embodiment, the proposal server 400 may receive user information of the user terminal 100 from the personal information server 300 and include a database for functions that the user may use. The user terminal 100 may receive the information about functions to be provided from the proposal server 400 through the communication network and provide the information to the user.

Figure 2:
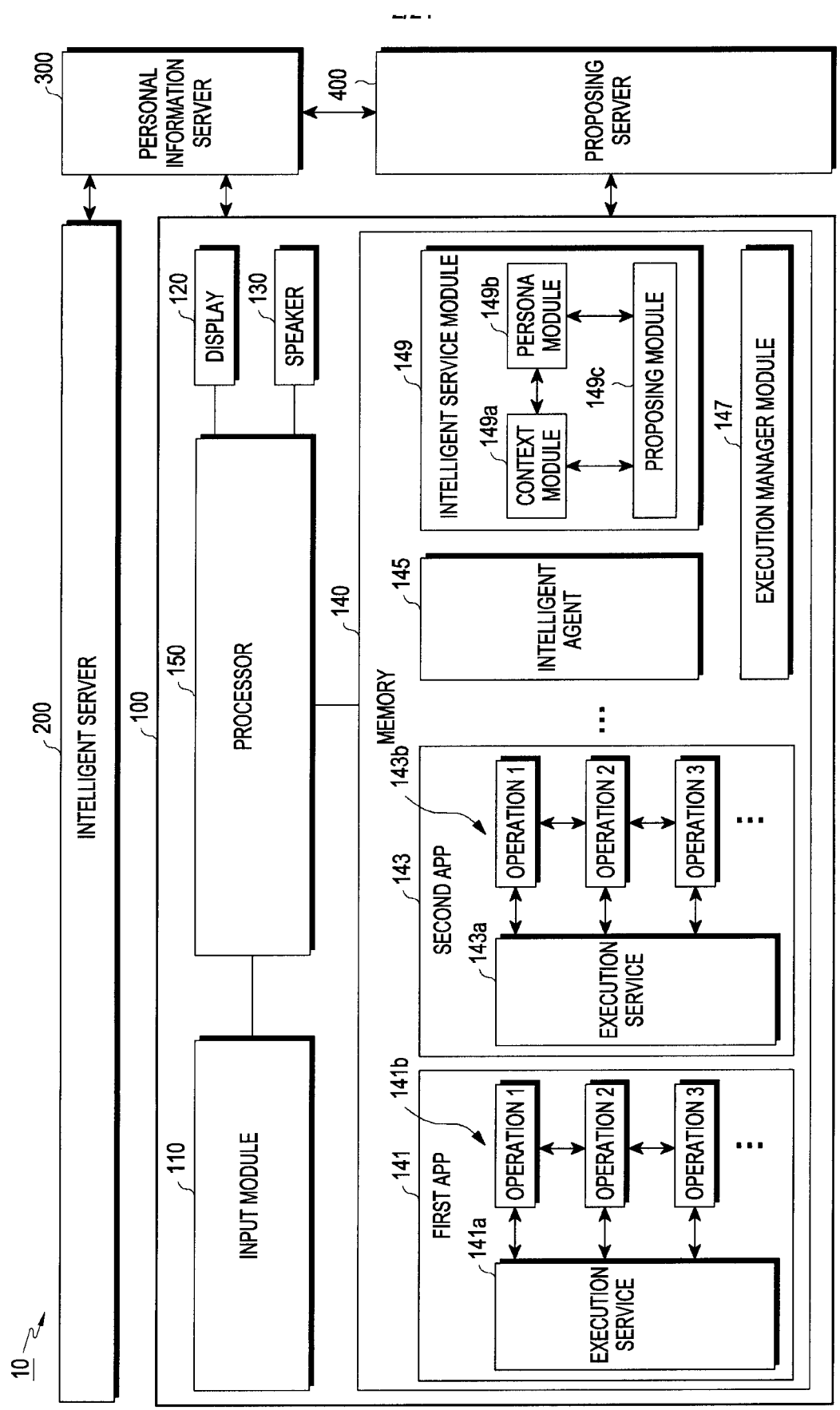
FIG. 2 is a block diagram illustrating a user terminal in an integrated intelligence system according to an embodiment.

FIG. 2 is a block diagram illustrating a user terminal in an integrated intelligence system according to an embodiment.

Referring to FIG. 2, according to an embodiment, the user terminal 100 may include an input module 110, a display 120, a speaker 130, a memory 140, and a processor 150. Hereinafter words, "processor" used in the singular context shall be understood to include one or more processors. The user terminal 100 may further include a housing. The components of the user terminal 100 may be positioned in or on the housing. According to an embodiment, the user terminal 100 may further include a communication circuit positioned inside the housing. According to an embodiment, the user terminal 100 may transmit or receive data (or information) to/from an external server (e.g., the intelligent server 200) through the communication circuit. The processor 150 is configured to provide a function according to a first utterance of a user for wake-up by the input module 110. The processor 150 is further configured to receive a second utterance of the user including a plurality of words with a predesignated relevant through the input module 110 while the function is provided. The communication circuit transmits information about the second utterance of the user, to another electronic device (such as the intelligent server 200), and receive a response related to the second utterance. According to an embodiment of the disclosure, the input module 110 may receive user inputs from the user. For example, according to an embodiment, the input module 110 may receive a user input from an external device (e.g., a keyboard or headset) connected thereto. As another example, according to an embodiment, the input module 110 may include a touchscreen combined with the display 120 (e.g., a touchscreen display). As another example, the input module 110 may include a hardware key (or a physical key) 112 positioned in the user terminal 100 (or the housing of the user terminal 100).

According to an embodiment, the input module 110 may include a microphone capable of receiving user utterances as speech signals. For example, according to an embodiment, the input module 110 may include a speech input system and receive user utterances as speech signals through the speech input system. The microphone may be exposed through, e.g., a portion (e.g., a first portion) of the housing.

According to an embodiment of the disclosure, the display 120 may display images, videos, and/or application execution screens. For example, the display 120 may display a graphic user interface (GUI) of the app. According to an embodiment, the display 120 may be exposed through, e.g., a portion (e.g., a second portion) of the housing.

According to an embodiment of the disclosure, the speaker 130 may output speech signals. For example, according to an embodiment, the speaker 130 may output speech signals generated from inside the user terminal 100 to the outside. According to an embodiment, the speaker 130 may be exposed through, e.g., a portion (e.g., a third portion) of the housing.

According to an embodiment of the disclosure, the memory 140 may store a plurality of apps (or application programs) 141 and 143. The plurality of apps 141 and 143 may be, e.g., programs for performing a function corresponding to a user input. According to an embodiment of the disclosure, the memory 140 may include the intelligent agent 145, the execution manager module 147, or the intelligent service module 149. The intelligent agent 145, the execution manager module 147, and the intelligent service module 149 may be frameworks (or application frameworks) to process received user inputs (e.g., user utterances).

According to an embodiment of the disclosure, the memory 140 may include a database that may store information necessary to recognize user inputs. For example, the memory 140 may include a log database capable of storing log information. As another example, the memory 140 may include a persona database capable of storing user information.

According to an embodiment of the disclosure, the memory 140 may store the plurality of apps 141 and 143. The plurality of apps 141 and 143 may be loaded and operated. For example, the plurality of apps 141 and 143 stored in the memory 140 may be loaded and operated by the execution manager module 147. The plurality of apps 141 and 143 may include execution service modules 141a and 143a to perform functions. According to an embodiment, the plurality of apps 141 and 143 may execute a plurality of operations (e.g., a sequence of states) 141b and 143b through the execution service modules 141a and 143a to perform functions. In other words, the execution service modules 141a and 143a may be activated by the execution manager module 147 and execute the plurality of operations 141b and 143b.

According to an embodiment of the disclosure, when the operations 141b and 143b of the apps 141 and 143 are executed, the execution state screens as per the execution of the operations 141b and 143b may be displayed on the display 120. According to an embodiment, the execution state screens may be screens, e.g., in the state of the operations 141b and 143b having been completed. The execution state screens may be screens, e.g., in the state of the execution of the operations 141b and 143b having been stopped (partial landing) (e.g., when parameters required for the operations 141b and 143b are not inputted).

According to an embodiment of the disclosure, the execution service modules 141a and 143a may execute the operations 141b and 143b as per a path rule. For example, according to an embodiment, the execution service modules 141a and 143a may be activated by the execution manager module 147, receive an execution request as per the path rule from the execution manager module 147, and execute the operations 141b and 143b according to the execution request, thereby executing the functions of the apps 141 and 143. The execution service modules 141a and 143a, when the execution of the operations 141b and 143b is complete, may send completion information to the execution manager module 147.

According to an embodiment of the disclosure, when the plurality of operations 141b and 143b are executed on the apps 141 and 143, the plurality of operations 141b and 143b may sequentially be executed. When the execution of one operation (e.g., operation 1 of the first app 141 or operation 1 of the second app 143) is complete, the execution service modules 141a and 143a may open the next operation (e.g., operation 2 of the first app 141 or operation 2 of the second app 143) and send completion information to the execution manager module 147. Here, 'open an operation' may be appreciated as transitioning the operation into an executable state or preparing for the execution of the operation. In other words, unless the operation is open, the operation cannot be executed. Upon receiving the completion information, the execution manager module 147 may transfer an execution request for the next operation (e.g., operation 2 of the first app 141 or operation 2 of the second app 143) to the execution service module. According to an embodiment of the disclosure, when the plurality of apps 141 and 143 are executed, the plurality of apps 141 and 143 may sequentially be executed. For example, when the execution of the last operation of the first app 141 (e.g., operation 3 of the first app 141) is complete, and completion information is thus received, the execution manager module 147 may send an execution request for the first operation of the second app 143 (e.g., operation 1 of the second app 143) to the execution service module 143a.

According to an embodiment of the disclosure, when the plurality of operations 141b and 143b are executed on the apps 141 and 143, the resultant screens of execution of the plurality of operations 141b and 143b may be displayed on the display 120. According to an embodiment of the disclosure, only some of the plurality of resultant screens of execution of the plurality of operations 141b and 143b may be displayed on the display 120.

According to an embodiment of the disclosure, the memory 140 may store an intelligent app (e.g., a speech recognition app) interworking with the intelligent agent 145. According to an embodiment, the app interworking with the intelligent agent 145 may receive a user utterance as a speech signal and process the same. According to an embodiment of the disclosure, the app interworking with the intelligent agent 145 may be operated by particular inputs entered through the input module 110 (e.g., inputs through the hardware key, touchscreen, or particular speech).

According to an embodiment of the disclosure, the intelligent agent 145, the execution manager module 147, or the intelligent service module 149 stored in the memory 140 may be executed by the processor 150. According to an embodiment, the functions of the intelligent agent 145, the execution manager module 147, or the intelligent service module 149 may be implemented by the processor 150. According to an embodiment, the functions of the intelligent agent 145, the execution manager module 147, and the intelligent service module 149 are described in connection with operations of the processor 150. According to an embodiment of the disclosure, the intelligent agent 145, the execution manager module 147, or the intelligent service module 149 stored in the memory 140 may be implemented in software or hardware.

According to an embodiment of the disclosure, the processor 150 may control the overall operation of the user terminal 100. For example, the processor 150 may control the input module 110 to receive user inputs. According to an embodiment, the processor 150 may control the display 120 to display images. According to an embodiment, the processor 150 may control the speaker 130 to output speech signals. According to an embodiment, the processor 150 may control the memory 140 to execute programs and fetch or store necessary information.

According to an embodiment of the disclosure, the processor 150 may execute the intelligent agent 145, the execution manager module 147, or the intelligent service module 149 stored in the memory 140. Thus, the processor 150 may implement the function of the intelligent agent 145, the execution manager module 147, or the intelligent service module 149, according to an embodiment.

According to an embodiment of the disclosure, the processor 150 may execute the intelligent agent 145 to generate commands to operate apps based on speech signals received as user inputs. According to an embodiment of the disclosure, the processor 150 may execute the execution manager module 147 to execute the apps 141 and 143 stored in the memory 140 as per the commands generated. According to an embodiment, the processor 150 may execute the intelligent service module 149 to manage the user information and process user inputs using the user information.

According to an embodiment, the processor 150 may execute the intelligent agent 145 to send user inputs received through the input module 110 to the intelligent server 200 and process the user inputs through the intelligent server 200.

According to an embodiment of the disclosure, the processor 150 may execute the intelligent agent 145 to pre-process the user inputs before sending the user inputs to the intelligent server 200. According to an embodiment of the disclosure, the intelligent agent 145 may include an adaptive echo canceller (AEC) module, a noise suppression (NS) module, an end-point detection (EPD) module, or an automatic gain control (AGC) module to pre-process the user inputs. According to an embodiment, the AEC module may remove echoes mixed in the user inputs. According to an embodiment, the NS module may suppress background noise mixed in the user inputs. According to an embodiment, the EPD module may detect end points of user speeches contained in the user inputs to find where the user speeches are present using the detected end points. The AGC module may recognize the user inputs and adjust the volume of the user inputs for a proper processing of the recognized user inputs. According to an embodiment of the disclosure, although able to execute all of the pre-processing components described above to provide a better performance, the processor 150 may alternatively execute some of the pre-processing components to be operated at reduced power.

According to an embodiment of the disclosure, the intelligent agent 145 may include a wake-up recognition module stored in the memory 140 to recognize the user's invocation. Thus, the processor 150 may recognize the user's wake-up command through the wake-up recognition module and upon receiving the wake-up command the processor 120 may execute the intelligent agent 145 to receive user inputs, according to an embodiment. According to an embodiment, the wake-up recognition module may be implemented in a low-power processor (e.g., a processor included in an audio codec). According to an embodiment, the processor 150 may execute the intelligent agent 145 upon receiving a user input through the hardware key. When the intelligent agent 145 is executed, an intelligent app (e.g., a speech recognition app) interworking with the intelligent agent 145 may be executed.

According to an embodiment of the disclosure, the intelligent agent 145 may include a speech recognition module to execute user inputs. The processor 150 may receive user inputs to execute operations on the app through the speech recognition module. For example, the processor 150 may recognize, through the speech recognition module, limited user (speech) inputs (e.g., the "Click" sound made when the capturing operation is executed on the camera app) for executing operations, such as the wake-up command on the apps 141 and 143. According to an embodiment, the processor 150 may assist the intelligent server 200 to recognize and quickly process user commands, which are processable in the user terminal 100, through the speech recognition module. According to an embodiment, the speech recognition module of the intelligent agent 145 to execute user inputs may be implemented in an app processor.

According to an embodiment of the disclosure, the speech recognition module (including the speech recognition module of the wake-up recognition module) of the intelligent agent 145 may recognize user inputs using an algorithm for recognizing speech. According to an embodiment, the algorithm used to recognize speech may be at least one of, e.g., a hidden markov model (HMM) algorithm, an artificial neural network (ANN) algorithm, or a dynamic time warping (DTW) algorithm.

According to an embodiment of the disclosure, the processor 150 may execute the intelligent agent 145 to convert the user's speech inputs into text data. For example, according to an embodiment, the processor 150 may send a user speech through the intelligent agent 145 to the intelligent server 200 and receive text data corresponding to the user speech from the intelligent server 200. Thus, the processor 150 may display the converted text data on the display 120, according to an embodiment.

According to an embodiment of the disclosure, the processor 150 may execute the intelligent agent 145 to receive a path rule from the intelligent server 200. According to an embodiment, the processor 150 may transfer the path rule to the execution manager module 147 through the intelligent agent 145.

According to an embodiment of the disclosure, the processor 150 may execute the intelligent agent 145 to transfer an execution result log as per the path rule received from the intelligent server 200 to the intelligent service module 149. The execution result log transferred may be accrued and managed in user preference information of a persona manager 149b.

According to an embodiment of the disclosure, the processor 150 may execute the execution manager module 147 to receive the path rule from the intelligent agent 145, execute the apps 141 and 143, and allow the apps 141 and 143 to execute the operations 141b and 143b contained in the path rule. For example, the processor 150 may send command information (e.g., path rule information) to execute the operations 141b and 143b to the apps 141 and 143 through the execution manager module 147 and receive completion information about the operations 141b and 143b from the apps 141 and 143.

According to an embodiment of the disclosure, the processor 150 may execute the execution manager module 147 to transfer command information (e.g., path rule information) to execute the operations 141b and 143b of the apps 141 and 143 between the intelligent agent 145 and the apps 141 and 143. The processor 150 may bind the apps 141 and 143 to be executed as per the path rule through the execution manager module 147 and transfer the command information (e.g., path rule information) about the operations 141b and 143b contained in the path rule to the apps 141 and 143. For example, the processor 150 may sequentially transfer the operations 141b and 143b contained in the path rule to the apps 141 and 143 through the execution manager module 147, sequentially executing the operations 141b and 143b of the apps 141 and 143 as per the path rule.

According to an embodiment, the processor 150 may execute the execution manager module 147 to manage the execution states of the operations 141b and 143b of the apps 141 and 143. For example, the processor 150 may receive information about the execution states of the operations 141b and 143b from the apps 141 and 143 through the execution manager module 147. When the execution states of the operations 141b and 143b are, e.g., partial landing states (e.g., when no parameters required for the operations 141b and 143b are entered), the processor 150 may transfer information about the partial landing states to the intelligent agent 145 through the execution manager module 147. The processor 150 may request the user to enter necessary information (e.g., parameter information) using the information transferred through the intelligent agent 145. When the execution states of the operations 141b and 143b are other states, e.g., operation states, the processor 150 may receive an utterance from the user through the intelligent agent 145. The processor 150 may transfer information about the apps 141 and 143 being executed through the execution manager module 147 and the execution states of the apps 141 and 143 to the intelligent agent 145. The processor 150 may send the user utterance through the intelligent agent 145 to the intelligent server 200. The processor 150 may receive parameter information about the user utterance from the intelligent server 200 through the intelligent agent 145. The processor 150 may transfer the parameter information received through the intelligent agent 145 to the execution manager module 147. The execution manager module 147 may change the parameters of the operations 141b and 143b into new parameters using the received parameter information.

According to an embodiment, the processor 150 may execute the execution manager module 147 to transfer the parameter information contained in the path rule to the apps 141 and 143. When the plurality of apps 141 and 143 are sequentially executed as per the path rule, the execution manager module 147 may delivery the parameter information contained in the path rule from one app to the other.

According to an embodiment of the disclosure, the processor 150 may execute the execution manager module 147 to receive a plurality of path rules. The processor 150 may select a plurality of path rules based on the user utterance through the execution manager module 147. For example, when a user utterance specifies a certain app 141 to execute some operation 141a but does not specify another app 143 to execute the other operation 143b, the processor 150 may, through the execution manager module 147, receive a plurality of different path rules by which the same app 141 (e.g., Gallery app) to execute the operation 141a is executed and a different app 143 (e.g., message app or telegram app) to execute the other operation 143b is executed. The processor 150 may execute the same operations 141b and 143b (e.g., the same continuous operations 141b and 143b) of the plurality of path rules through the execution manager module 147. When the same operations have been executed, the processor 150 may, through the execution manager module 147, display, on the display 120, the state screen where the different apps 141 and 143 each contained in a respective one of the plurality of path rules may be selected.

According to an embodiment of the disclosure, the intelligent service module 149 may include a context module 149a, a persona module 149b, or a proposal module 149c.

According to an embodiment, the processor 150 may execute the context module 149a to gather current states of the apps 141 and 143 from the apps 141 and 143. For example, the processor 150 may execute the context module 149a to receive context information indicating the current states of the apps 141 and 143 to gather the current states of the apps 141 and 143 through the received context information.

According to an embodiment, the processor 150 may execute the persona module 149b to manage the personal information about the user using of the user terminal 100. For example, the processor 150 may execute the persona module 149b to gather use information and execution results of the user terminal 100 and manage the user's personal information using the gathered use information and execution results of the user terminal 100.

According to an embodiment, the processor 150 may execute the proposal module 149c to predict the user's intent and recommend a command for the user based on the user's intent. For example, the processor 150 may execute the proposal module 149c to recommend a command for the user given the user's current state (e.g., time, place, context, or app). As used herein, "user's intent" shall be understood to mean a machine determination of a probable intent by the user, regardless of whether the probable intent is the actual intent.

Figure 3:
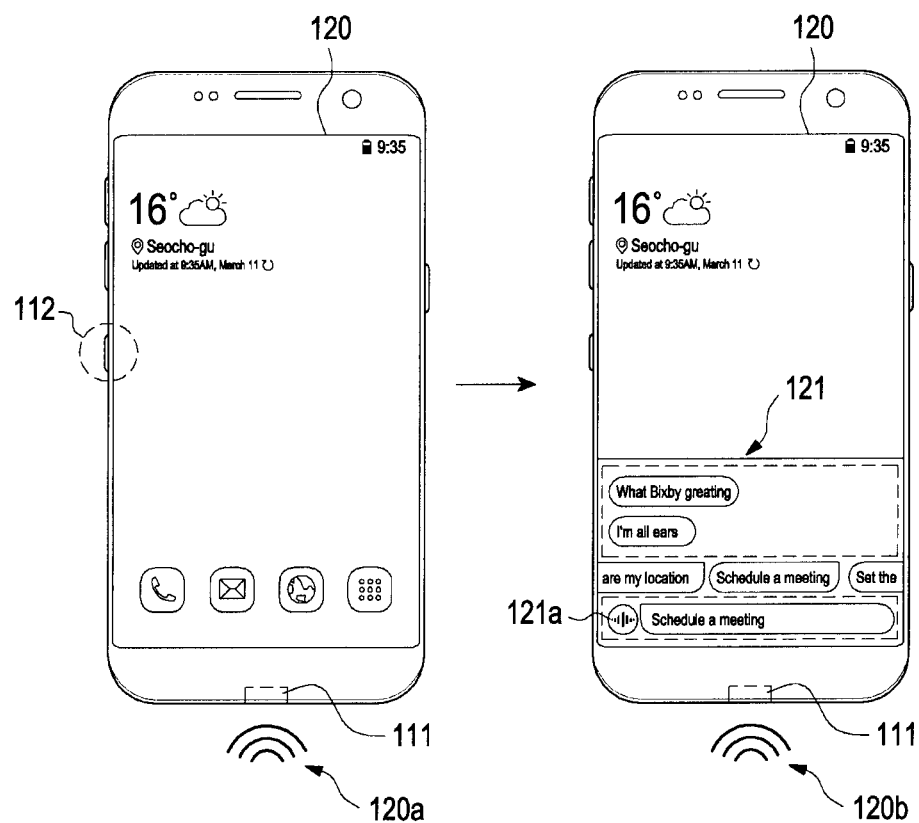
FIG. 3 is a view illustrating an example operation of executing an intelligent app on a user terminal according to an embodiment.

FIG. 3 is a view illustrating an example of executing an intelligent app on a user terminal according to an embodiment of the disclosure.

FIG. 3 illustrates an example in which the user terminal 100 receives user inputs and executes an intelligent app (e.g., a speech recognition app) interworking with the intelligent agent 145. On the left, the user terminal 100 receives a first user utterance 120a to wake-up. On the right, the user terminal 100 receives a second user utterance.

According to an embodiment of the disclosure, the user terminal 100 may execute an intelligent app to recognize speech through the hardware key 112. For example, when the user terminal 100 receives user inputs through the hardware key 112, the user terminal 100 may display a user interface (UI) 121 of the intelligent app on the display 120. The user may touch a speech recognition button 121a in the UI 121 of the intelligent app for speech entry 120b with the intelligent app UI 121 displayed on the display 120. As another example, the user may continuously press the hardware key 112 for speech entry 120b.

According to an embodiment of the disclosure, the user terminal 100 may execute an intelligent app to recognize speech through the microphone 111. For example, when a designated speech (e.g., "Wake up!") is entered (120a) through the microphone 111, the user terminal 100 may display the intelligent app UI 121 on the display 120.

Figure 4:
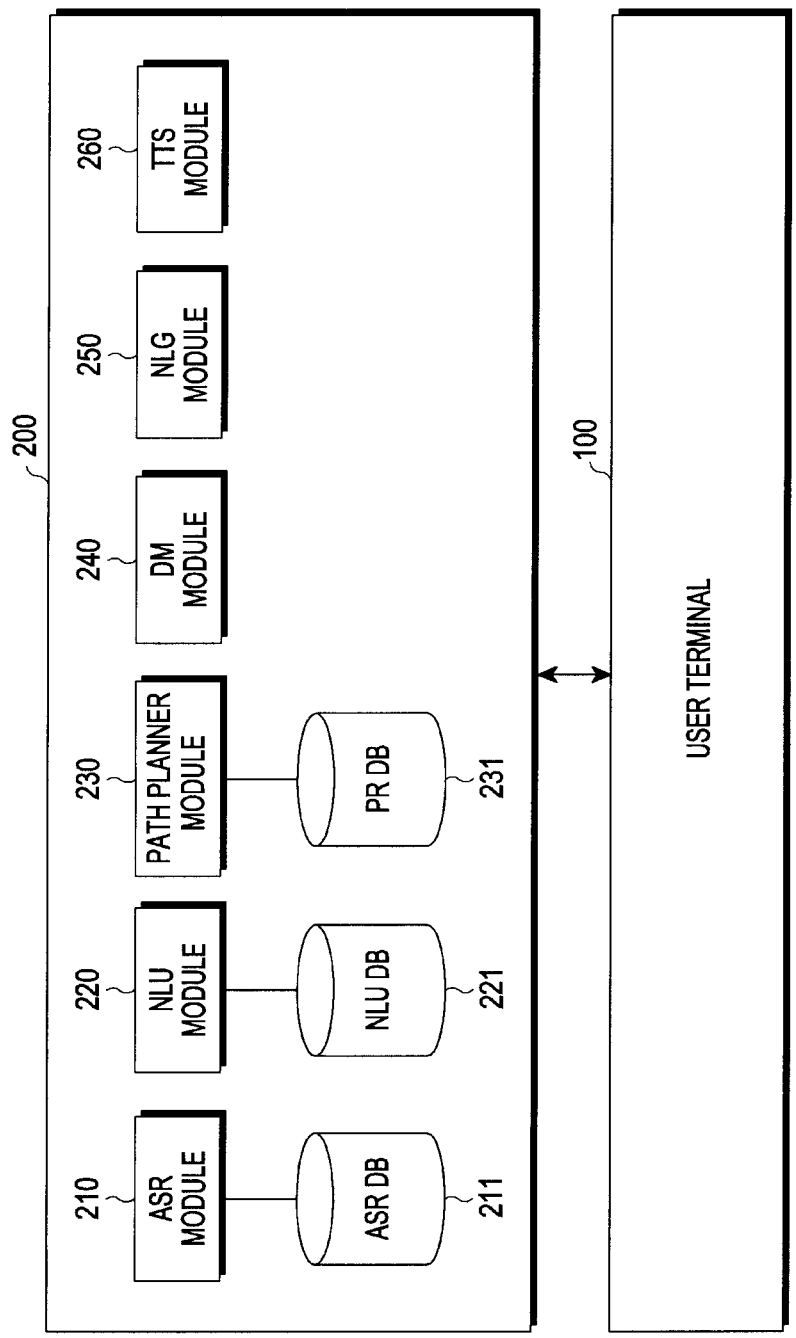
FIG. 4 is a block diagram illustrating an intelligent server in an integrated intelligence system according to an embodiment.

FIG. 4 is a block diagram illustrating an intelligent server in an integrated intelligence system according to an embodiment of the disclosure. The integrated intelligence system includes a user terminal 100 in communication with an intelligent server 200

Referring to FIG. 4, an intelligent server 200 may include an automatic speech recognition (ASR) module 210, a natural language understanding (NLU) module 220, a path planner module 230, a dialogue manager (DM) module 240, a natural language generator (NLG) module 250, or a text-to-speech (TTS) module 260. According to an embodiment, the intelligent server 200 may include a communication circuit, a memory, and a processor. The processor may execute commands stored in the memory to drive the ASR module 210, the NLU module 220, the path planner module 230, the DM module 240, the NLG module 250, and the TTS module 260. The intelligent server 200 may transmit or receive data (or information) to/from an external electronic device (e.g., the user terminal 100) through the communication circuit.

The NLU module 220 or the path planner module 230 of the intelligent server 200 may generate a path rule.

According to an embodiment of the disclosure, the ASR module 210 may convert user inputs received from the user terminal 100 into text data.

According to an embodiment of the disclosure, the ASR module 210 may convert user inputs received from the user terminal 100 into text data. For example, the ASR module 210 may include a speech recognition module. The speech recognition module may include an acoustic model and a language model. For example, the acoustic modem may include vocalization-related information, and the language model may include unit phonemic information and combinations of pieces of unit phonemic information. The speech recognition module may convert user utterances into text data using the vocalization-related information and unit phonemic information. Information about the acoustic model and the language model may be stored in, e.g., an automatic speech recognition (ASR) database (DB) 211. According to an embodiment of the disclosure, the NLU module 220 may perform syntactic analysis or semantic analysis to grasp the user's intent. As per the syntactic analysis, the user input may be divided into syntactic units (e.g., words, phrases, or morphemes) and what syntactic elements the syntactic units have may be grasped. The semantic analysis may be performed using, e.g., semantic matching, rule matching, or formula matching. Thus, the NLU module 220 may obtain a domain, intent, or parameters (or slots) necessary to represent the intent for the user input.

According to an embodiment of the disclosure, the NLU module 220 may determine the user's intent and parameters using the matching rule which has been divided into the domain, intent, and parameters (or slots) necessary to grasp the intent. For example, one domain (e.g., an alarm) may include a plurality of intents (e.g., alarm settings or releasing alarm), and one intent may include a plurality of parameters (e.g., time, repetition count, or alarm sound). The plurality of rules may include, e.g., one or more essential element parameters. The matching rule may be stored in a natural language understanding (NLU) database (DB) 221. The NLU DB 211 can also include particularities associated with the user's speech, due to for example, accent, speaking style, and common terms.

According to an embodiment of the disclosure, the NLU module 220 may grasp the meaning of a word extracted from the user input using linguistic features (e.g., syntactic elements) such as morphemes or phrases, match the grasped meaning of the word to the domain and intent, and determine the user's intent. For example, the NLU module 220 may calculate how many words extracted from the user input are included in each domain and intent to thereby determine the user's intent. According to an embodiment of the disclosure, the NLU module 220 may determine the parameters of the user input using the word which is a basis for grasping the intent. According to an embodiment of the disclosure, the NLU module 220 may determine the user's intent using the NLU DB 221 storing the linguistic features for grasping the intent of the user input. According to an embodiment of the disclosure, the NLU module 220 may determine the user's intent using a personal language model (PLM). For example, the NLU module 220 may determine the user's intent using personal information (e.g., contacts list or music list). The PLM may be stored in, e.g., the NLU DB 221. According to an embodiment of the disclosure, the ASR module 210, but not the NLU module 220 alone, may recognize the user's speech by referring to the PLM stored in the NLU DB 221.

According to an embodiment of the disclosure, the NLU module 220 may generate a path rule based on the intent of the user input and parameters. For example, the NLU module 220 may select an app to be executed based on the intent of the user input and determine operations to be performed on the selected app. The NLU module 220 may determine parameters corresponding to the determined operations to generate a path rule. According to an embodiment of the disclosure, the path rule generated by the NLU module 220 may include information about the app to be executed, operations (e.g., at least one or more states) to be executed on the app, and the parameters necessary to execute the operations.

According to an embodiment of the disclosure, the NLU module 220 may generate one or more path rules based on the parameters and intent of the user input. For example, the NLU module 220 may receive a path rule set corresponding to the user terminal 100 from the path planner module 230, map the parameters and intent of the user input to the received path rule set, and determine the path rule.

According to an embodiment of the disclosure, the NLU module 220 may determine the app to be executed, operations to be executed on the app, and parameters necessary to execute the operations based on the parameters and intent of the user input, thereby generating one or more path rules. For example, the NLU module 220 may generate a path rule by arranging the app to be executed and the operations to be executed on the app in the form of ontology or a graph model according to the user input using the information of the user terminal 100. The generated path rule may be stored through, e.g., the path planner module 230 in a path rule database (PR DB) 231. The generated path rule may be added to the path rule set of the database 231.

According to an embodiment of the disclosure, the NLU module 220 may select at least one of a plurality of path rules generated. For example, the NLU module 220 may select the optimal one of the plurality of path rules. As another example, the NLU module 220 may select a plurality of path rules when only some operations are specified based on the user utterance. The NLU module 220 may determine one of the plurality of path rules by the user's additional input.

According to an embodiment of the disclosure, the NLU module 220 may send the path rule to the user terminal 100 at a request for the user input. For example, the NLU module 220 may send one path rule corresponding to the user input to the user terminal 100. As another example, the NLU module 220 may send a plurality of path rules corresponding to the user input to the user terminal 100. For example, when only some operations are specified based on the user utterance, the plurality of path rules may be generated by the NLU module 220.

According to an embodiment of the disclosure, the path planner module 230 may select at least one of the plurality of path rules.

According to an embodiment of the disclosure, the path planner module 230 may deliver a path rule set including the plurality of path rules to the NLU module 220. The plurality of path rules in the path rule set may be stored in the form of a table in the path rule database 231 connected with the path planner module 230. For example, the path planner module 230 may deliver a path rule set corresponding to information (e.g., OS information or app information) of the user terminal 100 which is received from the intelligent agent 145 to the NLU module 220. The table stored in the path rule database 231 may be stored, e.g., per domain or per domain version.

According to an embodiment of the disclosure, the path planner module 230 may select one or more path rules from the path rule set and deliver the same to the NLU module 220. For example, the path planner module 230 may match the user's intent and parameters to the path rule set corresponding to the user terminal 100 to select one or more path rules and deliver them to the NLU module 220.

According to an embodiment of the disclosure, the path planner module 230 may generate one or more path rules using the user's intent and parameters. For example, the path planner module 230 may determine an app to be executed and operations to be executed on the app based on the user's intent and parameters to generate one or more path rules. According to an embodiment of the disclosure, the path planner module 230 may store the generated path rule in the path rule database 231.

According to an embodiment of the disclosure, the path planner module 230 may store the path rule generated by the NLU module 220 in the path rule database 231. The generated path rule may be added to the path rule set stored in the path rule database 231.

According to an embodiment of the disclosure, the table stored in the path rule database 231 may include a plurality of path rules or a plurality of path rule sets. The plurality of path rule or the plurality of path rule sets may reflect the kind, version, type, or nature of the device performing each path rule.

According to an embodiment of the disclosure, the DM module 240 may determine whether the user's intent grasped by the path planner module 230 is clear. For example, the DM module 240 may determine whether the user's intent is clear based on whether parameter information is sufficient. The DM module 240 may determine whether the parameters grasped by the NLU module 220 are sufficient to provide a task. According to an embodiment of the disclosure, when the user's intent is unclear, the DM module 240 may perform feedback to send a request for necessary information to the user. For example, the DM module 240 may perform feedback to send a request for parameter information to grasp the user's intent.

According to an embodiment of the disclosure, the DM module 240 may include a content provider module. When the operation can be performed based on the intent and parameters grasped by the NLU module 220, the content provider module may generate the results of providing the task corresponding to the user input. According to an embodiment of the disclosure, the DM module 240 may send the results generated by the content provider module to the user terminal 100 in response to the user input.

According to an embodiment of the disclosure, the NLG module 250 may convert designated information into text. The text information may be in the form of a natural language utterance. The designated information may be, e.g., information about an additional input, information indicating that the operation corresponding to the user input is complete, or information indicating the user's additional input (e.g., feedback information for the user input). The text information may be sent to the user terminal 100 and displayed on the display 120, or the text information may be sent to the TTS module 260 and converted into a speech.

According to an embodiment of the disclosure, the TTS module 260 may convert text information into speech information. The TTS module 260 may receive the text information from the NLG module 250, convert the text information into speech information, and send the speech information to the user terminal 100. The user terminal 100 may output the speech information through the speaker 130.

According to an embodiment of the disclosure, the NLU module 220, the path planner module 230, and the DM module 240 may be implemented in a single module. For example, the NLU module 220, the path planner module 230, and the DM module 240 may be implemented in a single module to determine the user's intent and parameter and to generate a response (e.g., a path rule) corresponding to the user's intent and parameters determined. Accordingly, the generated response may be transmitted to the user terminal 100.

Figure 5:
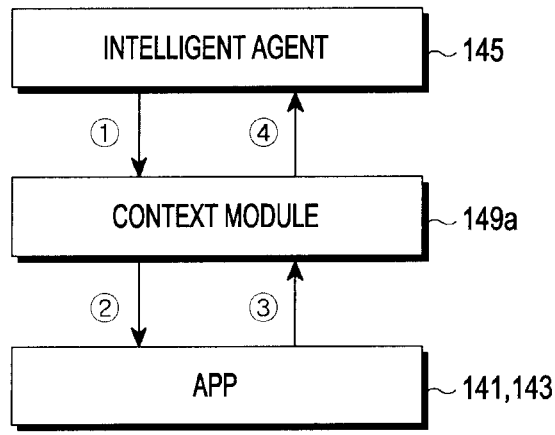
FIG. 5 is a view illustrating an example operation of gathering current states by a context module of an intelligent service module according to an embodiment.

FIG. 5 is a view illustrating an example of gathering current states by a context module of an intelligent service module according to an embodiment of the disclosure.

Referring to FIG. 5, upon receiving (①) a context request from the intelligent agent 145, the processor 150 may send a request (②) for context information indicating the current states to the apps 141 and 143 via the context module 149*a*. According to an embodiment of the disclosure, the processor 150 may, through the context module 149*a*, receive (③) the context information from the apps 141 and 143 and send (④) to the intelligent agent 145.

According to an embodiment, the processor 150 may receive a plurality of context information from the apps 141 and 143 via the context module 149*a*. The context information may be, e.g., information about the apps 141 and 143 executed latest. As another example, the context information may be information about the current states of the apps 141 and 143 (e.g., in a case where a photo is viewed in a gallery, information about the photo).

According to an embodiment of the disclosure, the processor 150 may, through the context module 149a, receive the context information indicating the current state of the user terminal 100 not only from the apps 141 and 143 but also from a device platform. The context information may include normal context information, user context information, or device context information.

The normal context information may include normal information about the user terminal 100. The normal context information may be identified by receiving data through, e.g., a sensor hub of the device platform, and by an internal algorithm. For example, the normal context information may include information about the current time/space. The information about the current time/space may include information about, e.g., the current time, or the current position of the user terminal 100. The current time may be identified by the clock of the user terminal 100, and the information about the current position may be identified by the global positioning system (GPS). As another example, the normal context information may include information about physical motion. The information about physical motion may include information about, e.g., walking, running, or driving. The physical motion information may be identified by a motion sensor. The driving information may be identified by the motion sensor, and a Bluetooth connection in the vehicle may be detected so that getting aboard and parking may be identified. As another example, the normal context information may include user activity information. The user activity information may include information about, e.g., commuting, shopping, or traveling. The user activity information may be identified using information about the place which has been registered in the database by the user or app.

For example, when the normal context information indicates that the user is driving, the context module 149a may bias the intelligent agent 145 towards selecting navigation applications. If the normal context information indicates that it is night time, the context module 145 may bias the intelligent agent towards applications related to finding restaurants, and nightclubs. If the GPS indicates that the user is away from their city of residence, the context module 149a may bias the intelligent agent 145 towards traveling applications.

The user context information may include information about the user. For example, the user context information may include information about the user's emotional state. For example, the biosensor can indicate the user's pulse rate and determine stress levels. A rapid pulse rate, followed by louder speaking volume detected by the microphone can indicate that the user is upset or in distress, while a lower pulse rate and softer voice may indicate that the user is in a relaxed state. The emotional state information may include information about, e.g., the user's happiness, sadness, or anger. A distressed state of the user may cause the context module 149a to bias the intelligent agent 145 to selecting applications for emergencies. As another example, the user context information may include information about the user's current state. The current state information may include information about, e.g., interest or intent (e.g., shopping).

The device context information may include information about the state of the user terminal 100. For example, the device context information may include information about the path rule executed by the execution manager module 147. As another example, the device information may include battery information. The battery information may be identified through, e.g., charged or discharged state of the battery. As another example, the device information may include information about the network or a connected device. The information about the connected device may be identified through the communication interface connected with the device.

Figure 6:
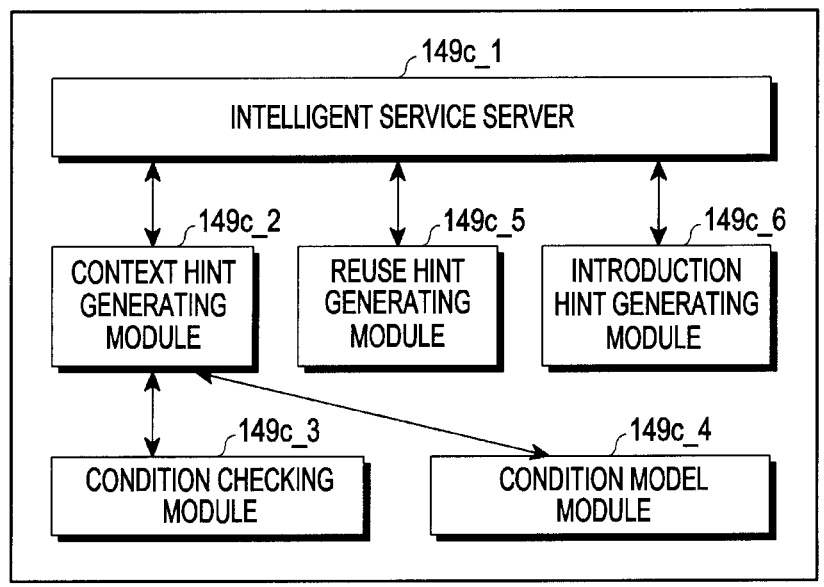
FIG. 6 is a block diagram illustrating a proposal module of an intelligent service module according to an embodiment.

FIG. 6 is a block diagram illustrating a suggesting module of an intelligent service module according to an embodiment of the disclosure. The intelligent service server 149c_1 may use input from the context hint generating module 149c_2, the reuse hint generating module 149c_5, and introduction hint generating module 149c_6 to determine a function.

Referring to FIG. 6, the proposal module 149c may include a hint providing module 149c_1, a context hint generating module 149c_2, a condition checking module 149c_3, condition model module 149c_4, a reuse hint generating module 149c_5, or an introduction hint generating module 149c_6.

According to an embodiment of the disclosure, the processor 150 may execute the hint providing module 149c_1 may provide hints to the user. For example, the processor 150 may, through the hint providing module 149c_1, receive generated hints from the context hint generating module 149c_2, the reuse hint generating module 149c_5, or introduction hint generating module 149c_6 and provide the hints to the user.

According to an embodiment of the disclosure, the processor 150 may execute the condition checking module 149c_3 or the condition model module 149c_4 to generate hits recommendable as per the current state. The processor 150 may execute the condition checking module 149c_3 to receive information corresponding to the current state and execute the condition model module 149c_4 to set a condition model using the received information. For example, the processor 150 may execute the condition model module 149c_4 to grasp, e.g., the time, location, context, or app being used, where the hints are provided to the user and provide the user with the hints highly likely to be used in descending order of priority.

According to an embodiment of the disclosure, the processor 150 may execute the reuse hint generating module 149c_5 to generate hints as per the use frequency. For example, the processor 150 may execute the reuse hint generating module 149c_5 to generate hints based on the user's use pattern.

According to an embodiment of the disclosure, the introduction hint generating module 149c_6 may generate hints to introduce the user to new functions or functions that other users frequently use. For example, a hint to introduce new functions may include an introduction to the intelligent agent 145 (e.g., a method to operate).

According to an embodiment of the disclosure, the context hint generating module 149c_2, condition checking module 149c_3, condition model module 149c_4, reuse hint generating module 149c_5, or introduction hint generating module 149c_6 of the proposal module 149c may be included in the personal information server 300. For example, the processor 150 may, through the hint providing module 149c_1 of the proposal module 149c, receive hints from the context hint generating module 149c_2, reuse hint generating module 149c_5, or introduction hint generating module 149c_6 of the personal information server 300 and provide the received hints to the user.

According to an embodiment of the disclosure, the user terminal 100 may provide hints according to a series of processes as follows. For example, upon receiving a provide hint request from the intelligent agent 145, the processor 150 may transfer a generate hint request to the context hint generating module 149c_2 through the hint providing module 149c_1. Upon receiving the generate hint request, the processor 150 may, through the condition checking module 149c_3, receive information corresponding to the current state from the context module 149a and persona module 149b. The processor 150 may transfer the received information to the condition model module 149c_4 through the condition checking module 149c_3 and may, the condition model module 149c_4, assign priorities to the hints provided to the user in descending order of availability using the information. The processor 150 may, through the context hint generating module 149c_2, identify (⑥) the condition and generate hints corresponding to the current state. The processor 150 may transfer the generated hints to the hint providing module 149c_1 through the context hint generating module 149c_2. The processor 150 may, through the hint providing module 149c_1, sort the hints as per a designated rule and transfer the hints to the intelligent agent 145.

According to an embodiment of the disclosure, the processor 150 may, through the hint providing module 149c_1, generate a plurality of context hints and assign priorities to the plurality of context hints as per a designated rule. According to an embodiment of the disclosure, the processor 150 may, through the hint providing module 149c_1, first provide the user with the higher-priority ones among the plurality of context hints.

According to an embodiment of the disclosure, the user terminal 100 may propose hints as per use frequency. For example, upon receiving a provide hint request from the intelligent agent 145, the processor 150 may transfer a generate hint request to the reuse hint generating module 149c_5 through the hint providing module 149c_1. Upon receiving the generate hint request, the processor 150 may, through the reuse hint generating module 149c_5, receive user information from the persona module 149b. For example, the processor 150 may, through the reuse hint generating module 149c_5, receive the path rule included in the user's preference information, parameters included in the path rule, frequency of execution of app, and information about the time/space where the app has been used, from the persona module 149b. The processor 150 may generate hints corresponding to the received user information through the reuse hint generating module 149c_5. The processor 150 may transfer the generated hints to the hint providing module 149c_1 through the reuse hint generating module 149c_5. The processor 150 may, through the hint providing module 149c_1, sort the hints and transfer the hints to the intelligent agent 145.

According to an embodiment of the disclosure, the user terminal 100 may propose hints for new functions. For example, upon receiving a provide hint request from the intelligent agent 145, the processor 120 may transfer a generate hint request to the introduction hint generating module 149c_6 through the hint providing module 149c_1. The processor 150 may, through the introduction hint generating module 149c_6, transfer a provide introduction hint request from a proposal server 400 and receive information about functions to be introduced from the proposal server 400. For example, the proposal server 400 may store the information about the functions to be introduced. A hint list for the functions to be introduced may be updated by the service operator. The processor 150 may transfer the generated hints to the hint providing module 149c_1 through the introduction hint generating module 149c_6. The processor 150 may, through the hint providing module 149c_1, sort the hints and transmit (⑥) the hints to the intelligent agent 145.

Accordingly, the processor 150 may provide hints generated by the context hint generating module 149c_2, reuse hint generating module 149c_5, or introduction hint generating module 149c_6 to the user through the proposal module 149c. For example, the processor 150 may, through the proposal module 149c, display the generated hints on the app that operates the intelligent agent 145 and receive inputs to select the hints from the user through the app.

Figure 7:
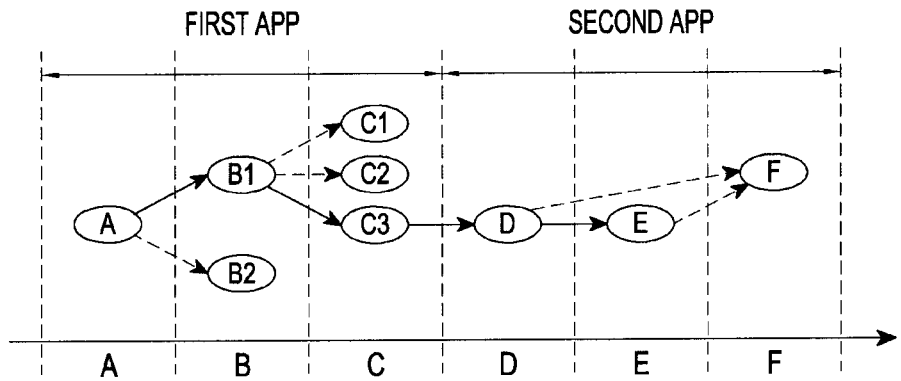
FIG. 7 is a view illustrating an example method for generating a path rule by a path planner module according to an embodiment.

FIG. 7 is a view illustrating a method for generating a path rule by a path planner module according to an embodiment of the disclosure.

Referring to FIG. 7, according to an embodiment of the disclosure, the NLU module 220 may divide functions of an app into any one operation (e.g., state A to state F) and store it in the path rule database 231. For example, the NLU module 220 may store a path rule set including a plurality of path rules A-B1-C1, A-B1-C2, A-B1-C3-D-F, and A-B1-C3-D-E-F divided into any one operation in the path rule database 231.

According to an embodiment of the disclosure, the path rule database 231 of the path planner module 230 may store the path rule set to perform the functions of the app. The path rule set may include a plurality of path rules including the plurality of operations (e.g., a sequence of states). In the plurality of path rules, the operations executed as per the parameters each inputted to a respective one of the plurality of operations may sequentially be arranged. According to an embodiment of the disclosure, the plurality of path rules may be configured in the form of ontology or a graph model and stored in the path rule database 231.

According to an embodiment of the disclosure, the NLU module 220 may select the optimal one A-B1-C3-D-F of the plurality of path rules A-B1-C1, A-B1-C2, A-B1-C3-D-F, and A-B1-C3-D-E-F corresponding to the parameters and the intent of the user input.

According to an embodiment of the disclosure, the NLU module 220 may deliver the plurality of path rules to the user terminal 100 unless there is a path rule perfectly matching the user input. For example, the NLU module 220 may select the path rule (e.g., A-B1) partially corresponding to the user input. The NLU module 220 may select one or more path rules (e.g., A-B1-C1, A-B1-C2, A-B1-C3-D-F, A-B1-C3-D-E-F) including the path rule (e.g., A-B1) partially corresponding to the user input and deliver the same to the user terminal 100.

According to an embodiment of the disclosure, the NLU module 220 may select one of the plurality of path rules based on an additional input of the user terminal 100 and deliver the selected path rule to the user terminal 100. For example, the NLU module 220 may select one (e.g., A-B1-C3-D-F) among the plurality of path rules (e.g., A-B1-C1, A-B1-C2, A-B1-C3-D-F, A-B1-C3-D-E-F) as per an additional user input (e.g., an input to select C3) of the user terminal 100 and send the selected path rule to the user terminal 100.

According to an embodiment of the disclosure, the NLU module 220 may determine the user's intent and parameters corresponding to the additional user input (e.g., an input to select C3) to the user terminal 100 through the NLU module 220 and send the user's intent or parameters determined to the user terminal 100. The user terminal 100 may select one (e.g., A-B1-C3-D-F) among the plurality of path rules (e.g., A-B1-C1, A-B1-C2, A-B1-C3-D-F, A-B1-C3-D-E-F) based on the parameters or intent sent.

Accordingly, the user terminal 100 may complete the operations of the apps 141 and 143 by the selected path rule.

According to an embodiment of the disclosure, when a user input having insufficient information is received by the intelligent server 200, the NLU module 220 may generate a path rule partially corresponding to the received user input. For example, the NLU module 220 may send the partially corresponding path rule to the intelligent agent 145. The processor 150 may execute the intelligent agent 145 to receive the path rule and transfer the partially corresponding path rule to the execution manager module 147. The processor 150 may execute a first app 141 as per the path rule through the execution manager module 147. The processor 150 may, through the execution manager module 147, send information about the insufficient parameters to the intelligent agent 145 while executing the first app 141. The processor 150 may, through the intelligent agent 145, send a request for additional input to the user using the information about the insufficient parameters. Upon receiving an additional input from the user, the processor 150 may, through the intelligent agent 145, send the same to the intelligent server 200 for processing. The NLU module 220 may generate an added path rule based on the parameter information and intent of the additional user input and send the path rule to the intelligent agent 145. The processor 150 may, through the intelligent agent 145, send the path rule to the execution manager module 147 to execute a second app 143.

According to an embodiment of the disclosure, when a user input having some missing information is received by the intelligent server 200, the NLU module 220 may send a request for user information to the personal information server 300. The personal information server 300 may send, to the NLU module 220, information about the user who has entered the user input stored in the persona database. The NLU module 220 may select a path rule corresponding to the user input having some missing operations using the user information. Accordingly, although a user input having some missing information is received by the intelligent server 200, the NLU module 220 may send a request for the missing information and receive an additional input, or the NLU module 3220 may use the user information, determining a path rule corresponding to the user input.

Table 1 below may represent an example path rule related to tasks requested by the user according to an embodiment.

TABLE 1

| Path rule ID | State | parameter |
| --- | --- | --- |
| Gallery_101 | pictureView(25) | NULL |
| | searchView(26) | NULL |
| | searchViewResult(27) | Location, time |
| | SearchEmptySelectedView(28) | NULL |
| | SearchSelectedView(29) | ContentType, selectall |
| | CrossShare(30) | anaphora |

Referring to Table 1, a path rule generated or selected by an intelligent server (e.g., the intelligent server 200 of FIG. 1) according to a user utterance (e.g., "Share photos!") may include at least one state 25, 26, 27, 28, 29, or 30. For example, the at least one state (e.g., any one operation state of the terminal) may correspond to at least one of executing a photo application (PicturesView) 25, executing a photo search function (SearchView) 26, outputting a search result display screen (SearchViewResult) 27, outputting a search result display screen with no photo selected (SearchEmptySelectedView) 28, outputting a search result display screen with at least one photo selected (SearchSelectedView) 29, or outputting a shared application selection screen (CrossShare) 30.

According to an embodiment, the path rule parameter information may correspond to at least one state. For example, it may be included in the state 29 of outputting a search result display screen with at least one photo selected.

As a result of performing the path rule including the sequence of states 25, 26, 27, 28, 29, or 30, corresponding to A-F, the task (e.g., "Share photos!") requested by the user may be performed.

Figure 8:
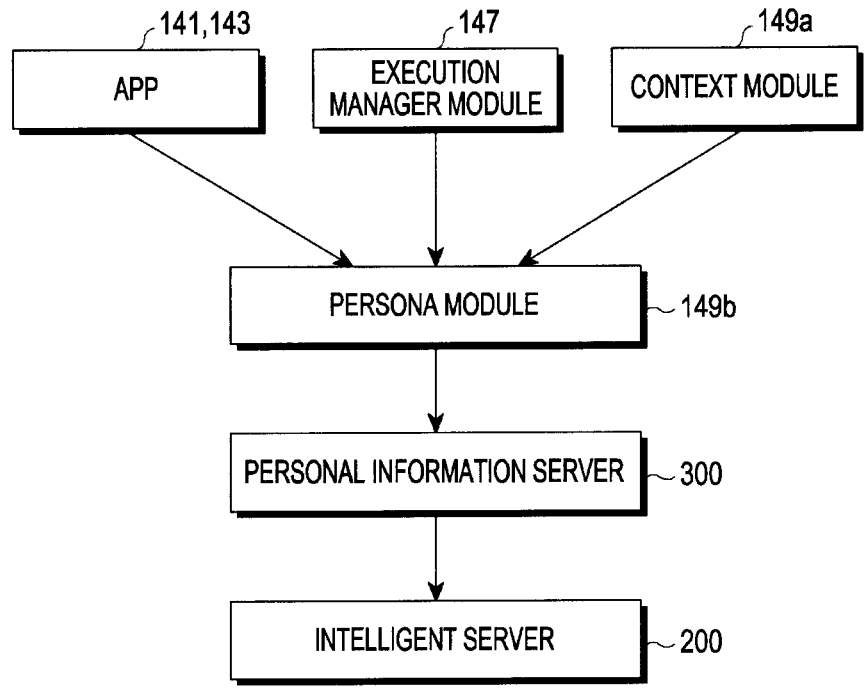
FIG. 8 is a view illustrating an example operation of managing user information by a persona module of an intelligent service module according to an embodiment.

FIG. 8 is a view illustrating an example of managing user information by a persona module 149b of an intelligent service module according to an embodiment of the disclosure.

Referring to FIG. 8, the processor 150 may receive information about the user terminal 100 from the apps 141 and 143, execution manager module 147, or the context module 149a through the persona module 149b. The processor 150 may, through the apps 141 and 143 and the execution manager module 147, store resultant information of execution of the app operations 141b and 143b in the operation log database. The processor 150 may, through the context module 149a, store information about the current state of the user terminal 100 in the context database. The processor 150 may, through the persona module 149, receive the stored information from the operation log database or the context database. The data stored in the operation log database and the context database may be analyzed by, e.g., an analysis engine, and transferred to the persona module 149b.

According to an embodiment of the disclosure, the processor 150 may, through the persona module 149b, send the information received from the apps 141 and 143, the execution manager module 147, or the context module 149a to the proposal module 149c. For example, the processor 150 may, through the persona module 149b, transfer the data stored in the operation log database or context database to the proposal module 149c.

According to an embodiment of the disclosure, the processor 150 may, through the persona module 149b, send the information received from the apps 141 and 143, the execution manager module 147, or the context module 149a to the personal information server 300. For example, the processor 150 may, through the persona module 149b, periodically send the data accrued in the operation log database or context database to the personal information server 300.

According to an embodiment, the processor 150 may, through the persona module 149b, transfer the data stored in the operation log database or context database to the proposal module 149c. User information generated by the persona module 149b may be stored in a persona database. The persona module 149b may periodically send user information stored in the persona database to the personal information server 300. According to an embodiment of the disclosure, the information sent by the persona module 149b to the personal information server 300 may be stored in the persona database. The personal information server 300 may infer user information necessary to generate a path rule of the intelligent server 200 using the information stored in the persona database.

According to an embodiment of the disclosure, the user information inferred using the information sent from the persona module 149b may include profile information or preference information. The profile information or the preference information may be inferred through the user's account and accrued information.

The profile information may include the user's personal information. The profile information may include, e.g., the user's demographic information. The demographic information may include, e.g., the user's gender, age, address, marital status, and occupation. As another example, the profile information may include life event information. The life event information may be inferred by comparing log information with a life event model, and reinforced by analyzing the behavior pattern. As another example, the profile information may include interest information. The interest information may include, e.g., shopping interests or personal interests (e.g., sports interests or political leanings). For example, the profile information may include activity region information. The activity region information may include information about, e.g., home or workplace. The activity region information may include not only information about place or location but also information about regions recorded with priorities based on the accrued time of stay and visit count. For example, the profile information may include activity time information. The activity time information may include information about, e.g., wake-up time, commute time, or sleep time. The commute time information may be inferred using the activity region information (e.g., information about home or workplace). The sleep time information may be inferred through unused time of the user terminal 100.

The preference information may include information about the user's preference. For example, the preference information may include information about an app preference. The app preference may be inferred through, e.g., record of use of app (e.g., use record per time or place). The app preference may be used to determine an app to be executed as per the user's current state (e.g., time or place). For example, the preference information may include information about contacts preference. The contacts preference may be inferred by analyzing, e.g., information about how frequent one has contact with another, e.g., per time or place. The contacts preference may be used to determine contacts as per the user's current state (e.g., contact to overlapping names). As another example, the preference information may include setting information. The setting information may be inferred by, e.g., analyzing how frequent particular settings are made, e.g., per time or place. The setting information may be used to make particular settings as per the user's current state (e.g., time, place, or context). For example, the preference information may include place preference. The place preference may be inferred through, e.g., a record of visit to a particular place (e.g., a record of visit per time). The place preference may be used to determine the place that the user is visiting as per the user's current state (e.g., time). For example, the preference information may include command preference. The command preference may be inferred through, e.g., frequency of use of commands (e.g., use frequency per time or place). The command preference may be used to determine a command pattern to be used as per the user's current state (e.g., time or place). In particular, the command preference may include information about the menu chosen mostly by the user in the current state of the app executed through an analysis of log information.

Figure 9A:
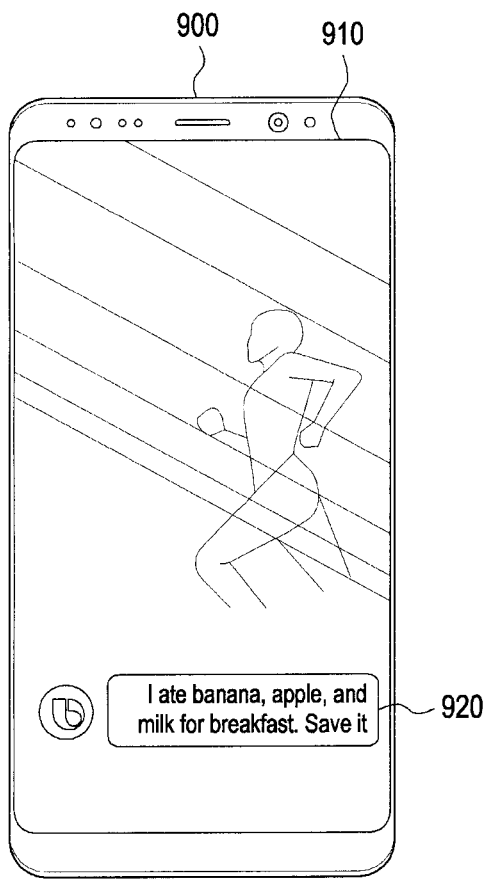
FIG. 9A and FIG. 9B are views illustrating example results of processing a user's utterance by an intelligent server according to the conventional art when the user's utterance contains a plurality of words corresponding to one parameter.
Figure 9B:
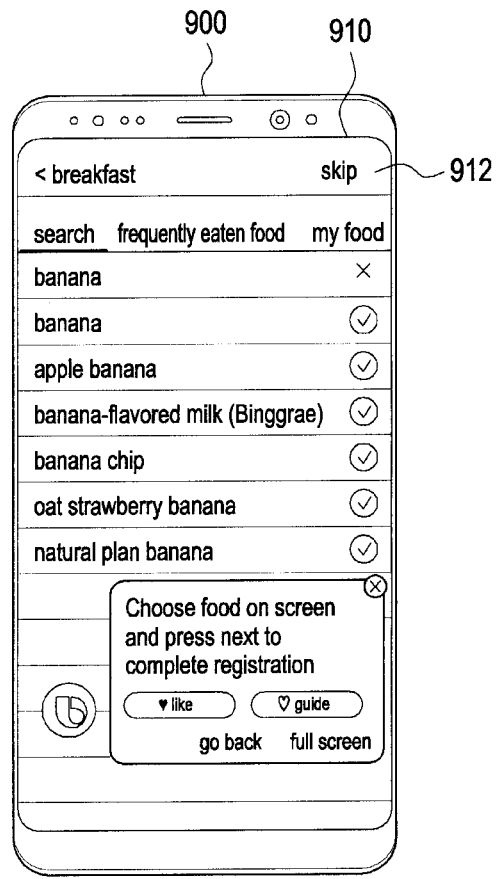

FIGS. 9A and 9B are views illustrating example results of processing a user's utterance by an intelligent server according to the conventional art when the user's utterance contains a plurality of words corresponding to one parameter.

Referring to FIG. 9A, according to the conventional art, a portable terminal 900 may receive a first utterance 920 (e.g., "I ate a banana, an apple, and milk for breakfast. Save it,") from the user. According to the conventional art, the portable terminal 900 may display the content of the utterance received from the user on the display module 910 of the portable terminal 900. The portable terminal 900 may transmit information about the first utterance 920 received to an intelligent service (not shown) of the conventional art. As the user terminal contains a plurality of words (e.g., banana, apple, milk) corresponding to one parameter (e.g., kind of food), the intelligent server might only select one of the plurality of words.

The intelligent server may generate operation information (e.g., a path rule) based on any one word selected. The intelligent server may transmit the generated operation information to the portable terminal 900. The portable terminal 900 may (e.g., sequentially) display a recommendation screen 912, as shown in FIG. 9B as an example, on a display module 910 based on the operation information received from the intelligent server. The portable terminal 900 provides a task depending on operation information based on one word (e.g., banana) as shown in FIG. 9B, with the result of failure to sufficiently reflect the user's intent.

Figure 10:
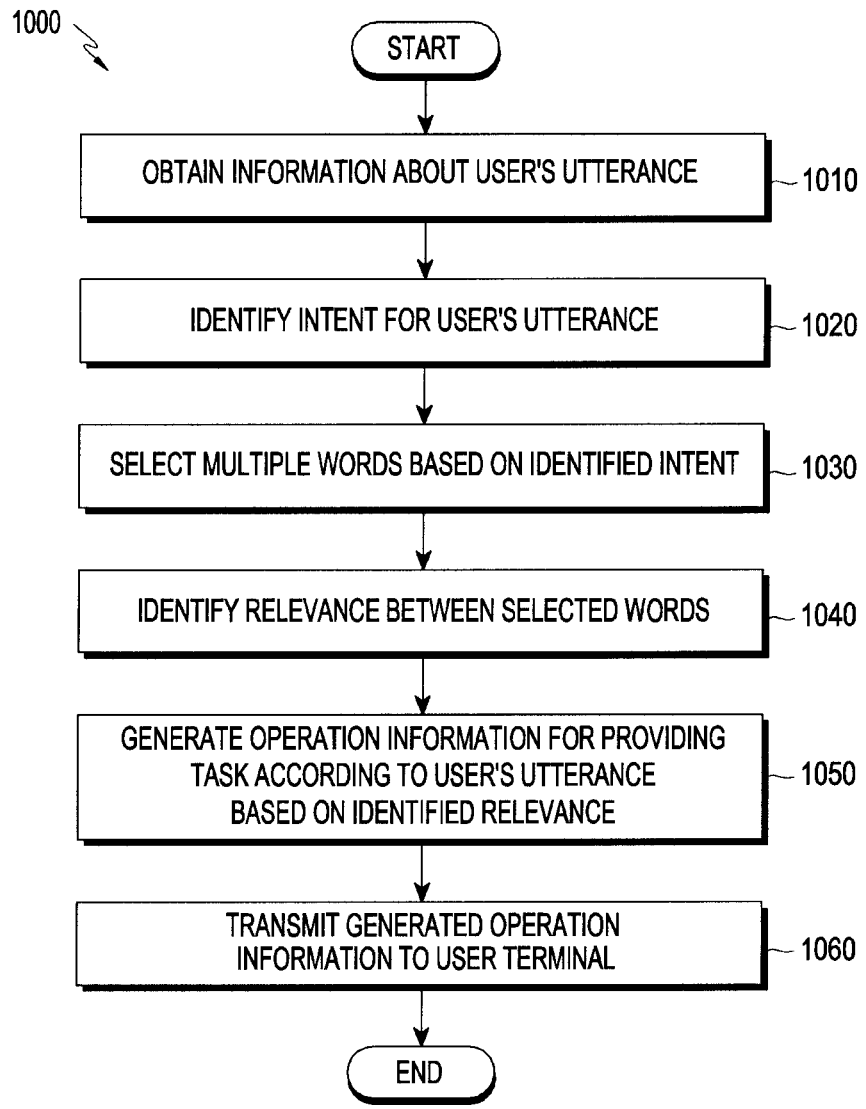
FIG. 10 is a view illustrating an example method of operating an intelligent server according to an embodiment.

FIG. 10 is a view illustrating an example of a method 1000 of operating an intelligent server (e.g., the intelligent server 200 of FIG. 1), according to an embodiment.

Referring to FIG. 10, according to an embodiment, the intelligent server (e.g., the intelligent server 200 of FIG. 1) may obtain information about a user's utterance transmitted from a user terminal (e.g., the user terminal 100 of FIG. 1) in operation 1010. According to an embodiment, the user's utterance may be an utterance containing words that may correspond to various predesignated parameters, such as, "I ate a banana, an apple, and milk for breakfast. Save it," "I ate one apple and one bowl of soybean soup for breakfast. Save it," or "Save 120 systolic and 80 diastolic."

According to an embodiment, the intelligent server (e.g., the intelligent server 200 of FIG. 1) may identify the intent for the user's utterance in operation 1020. According to an embodiment, operation 1020 may be performed by an NLU module (e.g., the NLU module 220 of FIG. 4).

According to an embodiment, the intelligent server (e.g., the intelligent server 200 of FIG. 1) may select a plurality of words based on the identified intent in operation 1030. According to an embodiment, the intelligent server (e.g., the intelligent server 200 of FIG. 1) may map the selected words to a predesignated parameter depending on the intent of the utterance. According to an embodiment, operation 1030 may also be appreciated as "extracting a parameter from the user's utterance." According to an embodiment, the predesignated parameter may include a parameter predesignated according to (or depending on) the user's intent identified in operation 1020. The parameters may be defined by different apps. For example, when the user's intent is identified as saving breakfast information (path rule ID: Samsung-Health_85"), at least one parameter of type of meal ("FoodSearchMeal") to indicate whether "breakfast," "lunch," or "dinner," food category ("FoodSearchCategory") to indicate whether "Korean food," "western food," or "Japanese food," result of meal ("FoodSearchResult") to indicate the kind of food, e.g., "apple," and the amount of a particular kind of food the user has eaten ("FoodSearchCount"), may be predesignated (or declared) as the predesignated parameter, according to an embodiment. According to an embodiment, such predesignated parameters are merely examples and certain embodiments of the disclosure are not limited thereto.

According to an embodiment, the intelligent server (e.g., the intelligent server 200 of FIG. 1) may identify the relevance of the selected words in operation 1040. According to an embodiment, the relevance may include at least one of linking relation, logical operation relation, and order relation.

According to an embodiment, the linking relation may mean the relation in which a plurality of words (or parameters) may form a single semantic group (e.g., "apple" ("FoodSearchResult") and "one" ("FoodSearchCount")). According to an embodiment, the linking relation may be predesignated for a plurality of parameters. According to an embodiment, information about the linking relation (e.g., information about predesignated parameters) may be stored in, e.g., the LNU DB 221.

According to an embodiment, the logical operation relation may mean the relation in which a logical operation (e.g., size comparison) for a plurality of numbers included in the user's utterance is required to produce operation information. For example, when the user terminal (e.g., the user terminal 100 of FIG. 1) receives the user's utterance "Save 120 systolic and 80 diastolic,"), the user's intent may be identified as "storing blood pressure information" by the intelligent server (e.g., the intelligent server 200 of FIG. 1). According to an embodiment, a logical operation relation may be predesignated for parameters (e.g., "BPHighNumber" and "BPLowNumber") predesignated according to the user's intent identified. According to an embodiment, the intelligent server (e.g., the NLU module 220 of FIG. 4) may compare sizes of "120" and "80" included in the user's utterance. For example, according to an embodiment, the intelligent server (e.g., the NLU module 220 of FIG. 4) may designate (or map) the first number mentioned (or represented) in the user's utterance as "BPHighNumber" and the next mentioned number as "BPHighNumber" and compare the numbers in light of size. According to an embodiment, when a result of the comparison corresponds to a designated parameter (or the result of comparison is "true"), the intelligent server (e.g., the NLU module 220 of FIG. 4) may designate the parameter designated for each number as the final parameter. According to an embodiment, when the result of the comparison does not correspond to a designated parameter (or the result of comparison is "false"), the intelligent server (e.g., the NLU module 220 of FIG. 4) may switch the parameters designated for the plurality of numbers therebetween. According to an embodiment, the intelligent server (e.g., the NLU module 220 of FIG. 4) may designate the switched parameter as the final parameter for each number. According to an embodiment, when three or more numbers require size comparison, the intelligent server (e.g., the NLU module 220 of FIG. 4) may sequentially select two numbers and make a size comparison.

According to an embodiment, the order relation may mean a relation designated to allow a plurality of parameters to be processed (or set) as a single parameter so as to generate operation information. According to an embodiment, when the electronic device receives the user's utterance "Start a 5 kilometer running program," the intelligent server (e.g., the NLU module 220 of FIG. 4) may map "5 kilometer running" to a single parameter (e.g., "ProgramName"). According to an embodiment, "5 kilometer running" may be a set of words including three parameter types each of which corresponds to a respective one of "5 (or five)," "kilometer," and "running." According to an embodiment, the order relation may mean a relation designated for a corresponding parameter in a case where the order of the plurality of parameters is necessary to generate operation information. For example, the user's utterance may be required to follow the order: "5"→"kilometer"→"running" for the user terminal (e.g., the user terminal 100 of FIG. 1) to execute the "5 kilometer running program" according to the user's utterance. As such, when the order of the plurality of parameters is meaningful to generate operation information for providing a task according to the user's utterance, the order relation may be predesignated for certain parameters according to an embodiment.

According to an embodiment, the intelligent server (e.g., the intelligent server 200 of FIG. 1) may repetitively identify the relevance for each of the plurality of words contained in the user's utterance. According to an embodiment, the intelligent server (e.g., the intelligent server 200 of FIG. 1) may determine whether the user's utterance contains a plurality of word sets that have, or may have, a semantic group.

According to an embodiment, the intelligent server (e.g., the intelligent server 200 of FIG. 1) may generate operation information for providing a task according to the user's utterance based on the identified relevance in operation 1050. According to an embodiment, the intelligent server (e.g., the NLU module 220 or path planner module 230 of FIG. 4) may generate operation information (e.g., a path rule) in such a manner as to select at least one path rule corresponding to the intent of the user's utterance among at least one path rule stored in the path rule DB 231 and add (or update) information about the relevance identified in operation 1040 to the selected path rule. For example, the intelligent server may add the information about the relevance identified in operation 1040 to operation information (e.g., a path rule) including the state of executing (e.g., displaying a stored breakfast information providing screen) a particular application (e.g., Samsung® Health™ application). According to an embodiment, the intelligent server (e.g., the NLU module 220 or path planner module 230 of FIG. 4) may generate new operation information (e.g., a path rule) using the user's intent identified in operation 1020 and the relevance identified in operation 1040. For example, according to an embodiment, the intelligent server (e.g., the NLU module 220 or path planner module 230 of FIG. 4) may generate operation information (e.g., a path rule) including at least one state of executing a health application, outputting a meal information screen, outputting a breakfast screen, and outputting a stored breakfast menu. According to an embodiment, the intelligent server (e.g., the NLU module 220 or path planner module 230 of FIG. 4) may add the information about the relevance identified in operation 1040 to the particular state.

According to an embodiment, the intelligent server (e.g., the NLU module 220 or path planner module 230 of FIG. 4) may store the generated operation information in an NLU DB (e.g., the NLU DB 220 of FIG. 4) or a path rule DB (e.g., the path rule DB 230 of FIG. 4).

According to an embodiment, the intelligent server (e.g., the intelligent server 200 of FIG. 1) may transmit the generated operation information to the user terminal (e.g., the user terminal 100 of FIG. 1) in operation 1060.

According to an embodiment, the intelligent server (e.g., the intelligent server 200 of FIG. 1) may further identify the domain (e.g., a particular application (e.g., Samsung Health), TV, or mobile terminal) corresponding to the user's utterance in operation 1020. For example, according to an embodiment, the intelligent server (e.g., the NLU module 220 of FIG. 4) may identify which domain the content of the user's utterance corresponds to, based on the linking relation information containing the linking relation between domain and the content of the user's utterance (or the user's intent), stored in the intelligent server (e.g., the NLU module 220 of FIG. 4).

FIGS. 11A to 11E are views illustrating example operations of selecting a word contained in a user's utterance by an intelligent server (e.g., the intelligent server 200 of FIG. 1) according to an embodiment.

Figure 11A:

Such an example is described in connection with FIG. 11A where a user terminal (e.g., the user terminal 100 of FIG. 1) receives the user's utterance "I ate one banana for breakfast. Save it." According to an embodiment, the intelligent server (e.g., the intelligent server 200 of FIG. 1) may identify the user's intent from the user's utterance and map at least one word (or select a word from the user's utterance) to at least one parameter predesignated according to the identified intent. According to an embodiment, the intelligent server (e.g., the intelligent server 200 of FIG. 1) may map "breakfast" of the user's utterance to a first parameter 1101 ("FoodSearchMeal"), "banana" to a second parameter 1102 ("FoodSearchResult"), and "one" to a third parameter 1103 ("FoodSearchCount"). According to an embodiment, the second parameter 1102 and the third parameter 1103 may be predesignated as having a linking relation therebetween, and the first parameter 1101 may be predesignated as having no linking relation (or independent relation) with the second parameter 1102 and the third parameter 1103. According to an embodiment, the independent relation may mean that there is no relevance between the parameters.

Figure 11B:
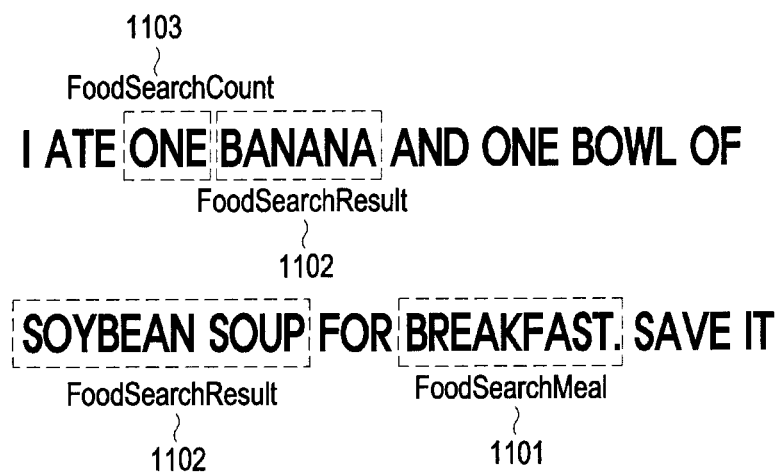

Such an example is described in connection with FIG. 11B where a user terminal (e.g., the user terminal 100 of FIG. 1) receives the user's utterance "I ate one banana and one bowl of soybean soup for breakfast. Save it." According to an embodiment, the intelligent server (e.g., the intelligent server 200 of FIG. 1) may map "breakfast" of the user's utterance to a first parameter 1101 ("FoodSearchMeal"), "banana" to a second parameter 1102 ("FoodSearchResult"), "one" to a third parameter 1103 ("FoodSearchCount"), "soybean soup" to the second parameter 1102 ("FoodSearchResult"), and "one bowl" to the third parameter 1103 ("FoodSearchCount").

Figure 11C:
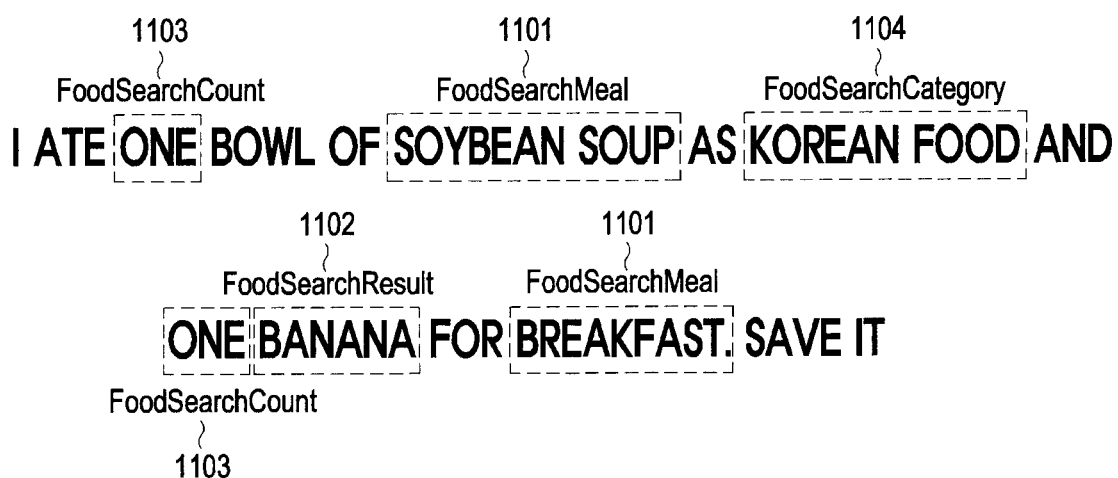

Such an example is described in connection with FIG. 11C where a user terminal (e.g., the user terminal 100 of FIG. 1) receives the user's utterance "I ate one bowl of soybean soup, as Korean food, and one banana for breakfast. Save it." According to an embodiment, the intelligent server (e.g., the intelligent server 200 of FIG. 1) may map "breakfast" of the user's utterance to a first parameter 1101 ("FoodSearchMeal"), "as Korean food" to a fourth parameter 1104 ("FoodSearchCategory"), "soybean soup" to the second parameter 1102 ("FoodSearchResult"), "one bowl" to the third parameter 1103 ("FoodSearchCount"), "banana" to the second parameter 1102 ("FoodSearchResult"), and "one" to the third parameter 1103 ("FoodSearchCount"). According to an embodiment, the first parameter 1101 may be predesignated as having independent relation with the second parameter 1102 through the fourth parameter 1104. According to an embodiment, the second parameter 1102 through the fourth parameter 1104 may be predesignated as having a linking relation therebetween.

Such an example is described in connection with FIG. 11D where a user terminal (e.g., the user terminal 100 of FIG. 1) receives the user's utterance "Save 120 (one hundred and twenty) systolic and 80 (eighty) diastolic." According to an embodiment, the intelligent server (e.g., the intelligent server 200 of FIG. 1) may temporarily or finally map "120 (i.e., one hundred and twenty)" to a fifth parameter 1105 ("BPHighNumber") and "80 (eighty)" to a sixth parameter 1106 ("BPLowNumber"). According to an embodiment, the fifth parameter 1105 and the sixth parameter 1106 may be predesignated as having logical operation relation.

Such an example is described in connection with FIG. 11E where a user terminal (e.g., the user terminal 100 of FIG. 1) receives the user's utterance "Start 5 kilometer running program." According to an embodiment, the intelligent server (e.g., the intelligent server 200 of FIG. 1) may map "5 (or five)" of the user's utterance to a 7-1 parameter 1107a ("Distance"), "kilometer" to a 7-2 parameter 1107b ("Unit"), and "running" to a 7-3 parameter 1107c ("Event"). According to an embodiment, the 7-1 parameter 1107a through the 7-3 parameter 1107c may be predesignated as having order relation. According to an embodiment, the intelligent server (e.g., the intelligent server 200 of FIG. 1) may map the 7-1 parameter 1107a through the 7-3 parameter 1107c to a single seventh parameter 1107 ("ProgramName") to generate operation information corresponding to the user's utterance.

Figure 12A:
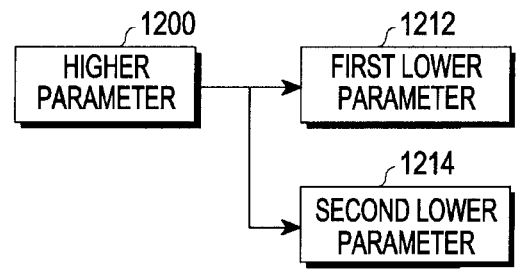
FIG. 12A and FIG. 12B are views illustrating an example hierarchy for a pre-designated parameter according to an embodiment.
Figure 12B:
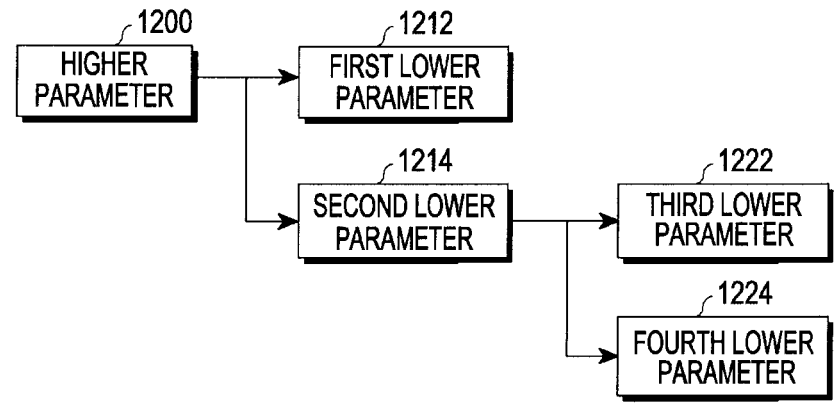

FIGS. 12A and 12B are views illustrating an example hierarchy for a pre-designated parameter according to an embodiment.

Referring to FIG. 12A, according to an embodiment, predetermined parameters (e.g., parameters with "linking relation") may have hierarchy. For example, a higher parameter 1200 (e.g., "FoodInfo" or "one banana") may be divided into a first lower parameter 1212 (e.g., "FoodSearchResult" or "banana") and a second lower parameter 1214 (e.g., "FoodSearchCount" or "one"). Thus, according to an embodiment, the intelligent server (e.g., the intelligent server 200 of FIG. 1) may understand "one banana" in the user's utterance as a phrase with a two-level depth. According to an embodiment, the first lower parameter 1212 and the second lower parameter 1214 may be at the same level. According to an embodiment, the intelligent server (e.g., the intelligent server 200 of FIG. 1) may identify depth information about a particular phrase. According to an embodiment, the intelligent server (e.g., the intelligent server 200 of FIG. 1) may generate operation information to include the identified depth information.

FIG. 12B illustrates an example in which parameters have a three-level depth according to an embodiment. For example, the higher parameter 1200 (e.g., "FoodInfowithCategory" or "one bowl of soybean soup as Korean food") may be divided into the first lower parameter 1212 (e.g., "FoodCategory" or "Korean food") and a second lower parameter 1214 (e.g., "FoodInfo" or "one bowl of soybean soup") which are at lower levels than the higher parameter 1200. According to an embodiment, the second lower parameter 1214 may be divided into a third lower parameter 1222 (e.g., "FoodSearchResult" or "soybean soup") and a fourth lower parameter 1224 (e.g., "FoodSearchCount" or "one bowl") which are at levels lower than the first lower parameter 1214 and the second lower parameter 1214. Thus, according to an embodiment, the intelligent server (e.g., the intelligent server 200 of FIG. 1) may understand "one bowl of soybean soup as Korean food" in the user's utterance as a phrase with a three-level depth. According to an embodiment, the third lower parameter 1222 and the fourth lower parameter 1224 may be at the same level. According to an embodiment, the intelligent server (e.g., the intelligent server 200 of FIG. 1) may also understand "one bowl of soybean soup as Korean food and one banana" as a phrase with a three-level depth. According to an embodiment, an example Javascript object notation (JSON)-based representation for the generated operation information may be shown as in Table 2 below:

TABLE 2

```
[{
"intent": "SamsungHealth_85",
"utterance": "Input one banana for breakfast",
"subIntents": [{
        "parameters": [ ],
        "subIntent": "ME"
}, {
        "parameters": [ ],
        "subIntent": "FoodTrack"
}, {
        "parameters": [{
                "slotName": "FoodSearchMeal",
                "slotType": "FoodSearchMeal",
                "slotValue": "Breakfast",
                "slotValueType": "String"
                "depth":1,
                "relationType":"independent":[{
                }]
                }
        ],
        "subIntent": "FoodSearchMeal"
}, {
        "parameters": [{
                "slotName": "FoodInfo",
                "slotType": "FoodInfo",
                "slotValue": "",
                "slotValueType": "String"
                "depth":2,
                "relationType": "related",[{
                        "slotName": "FoodSearchResult",
                        "slotType": "FoodSearchResult",
                        "slotValue": "banana",
                        "slotValueType": "String"
                        "depth":1,
                        "relationType":"independent":[{
                        }]
                }, {
                        "slotName": "FoodSearchCount",
                        "slotType": "FoodSearchCount",
                        "slotValue": "one",
                        "slotValueType": "String"
                        "depth":1,
                        "relationType":"independent":[{
                        }]
                }]
                }
        ],
        "subIntent": "FoodSearchResult"
        }
],
"taggedUtteranceHint": " input [for breakfast] [[one] [banana]] "
... ...
}]
```

According to an embodiment, certain embodiments of the disclosure may also apply when the user's utterance contains a plurality of sentences with different intentions. For example, when the user terminal (e.g., the user terminal 100 of FIG. 1) receives the user's utterance "Show me a screen to record drinking water. And add one more glass," the intent of the utterance "Show me a screen to record drinking water" may be to "view a record screen for beverages consumed," and the intent of the utterance "And add one more glass" may be to "add or delete a beverage." However, what the "one glass" is about may be missing from the second utterance, i.e., "And add one more glass," in the user's utterance. According to an embodiment, the parameter corresponding to "water" and the parameter corresponding to "one glass" may be predesignated to have relevance (e.g., linking relation) according to an embodiment. According to an embodiment, when a mandatory word (e.g., "water") is missing from the second utterance (e.g., "And add one more glass") in the user's consecutive utterances (or different utterances entered within a designated threshold time), the intelligent server (e.g., the intelligent server 200 of FIG. 1) may apply a word (e.g., "water"), which has relevance with the parameters corresponding to the words contained in the second utterance among the words contained in the first utterance (e.g., "Show me a screen for recording water drinking") received before the second utterance, to the second utterance. According to an embodiment, the intelligent server (e.g., the intelligent server 200 of FIG. 1) may identify the intent of the user's utterance received or generate operation information based on the second utterance to which a word from the first utterance has been applied.

FIGS. 13 to 15A are views illustrating example methods 1300, 1400, and 1500 of operating an intelligent server (e.g., the intelligent server 200 of FIG. 1) according to an embodiment.

Figure 13:
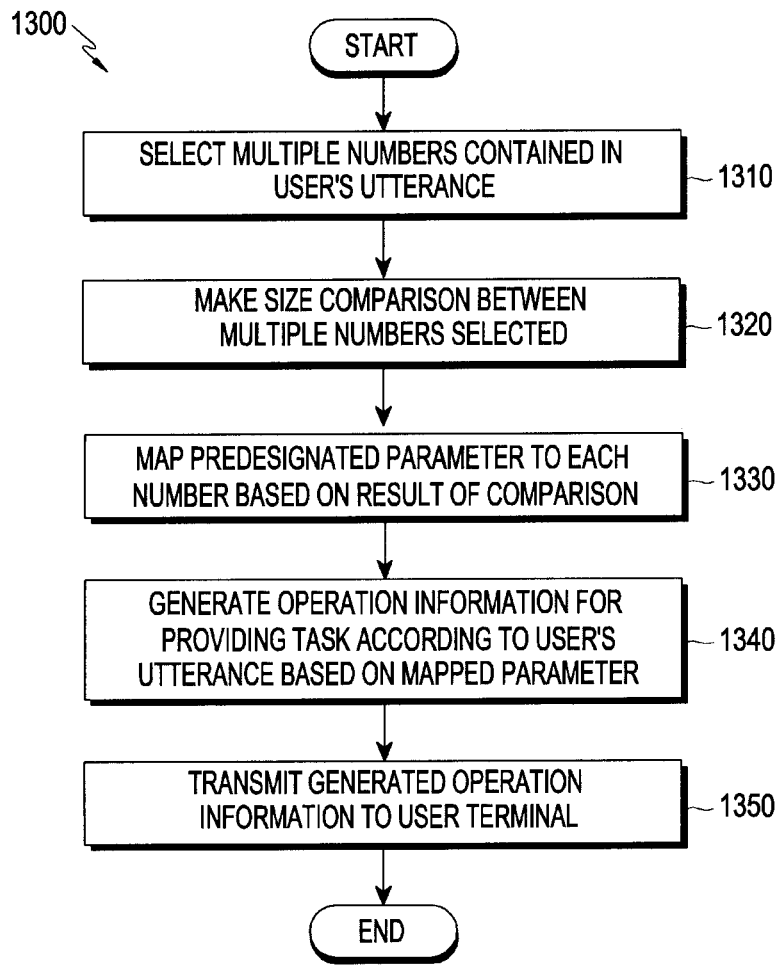
FIG. 13, FIG. 14, and FIG. 15A are views illustrating an example method of operating an intelligent server according to an embodiment.

FIG. 13 illustrates example operations of performing a logical operation relation by an intelligent server (e.g., the intelligent server 200 of FIG. 1) according to an embodiment. According to an embodiment, at least some of the operations described above in connection with FIG. 10 may likewise apply to the operations 1300.

Referring to FIG. 13, according to an embodiment, an intelligent server (e.g., the intelligent server 200 of FIG. 1) may select a plurality of numbers (e.g., "120" and "80") included in the user's utterance (e.g., "Save 120 systolic and 80 diastolic.") in operation 1310.

According to an embodiment, the intelligent server (e.g., the intelligent server 200 of FIG. 1) may make a size comparison between the plurality of numbers selected in operation 1320. According to an embodiment, a particular parameter may be provisionally (or temporarily) mapped to each of the plurality of parameters selected.

According to an embodiment, the intelligent server (e.g., the intelligent server 200 of FIG. 1) may map a predesignated parameter to each of the plurality of numbers based on a result of the comparison 1320, in operation 1330. According to an embodiment, when the result of comparison 1320 corresponds to (or matches) the temporarily mapped parameter, the intelligent server (e.g., the intelligent server 200 of FIG. 1) may finally (or conclusively) map the temporarily-mapped parameter to each number.

According to an embodiment, the intelligent server (e.g., the intelligent server 200 of FIG. 1) may, in operation 1340, generate operation information for providing a task corresponding to the user's utterance based on the parameter mapped in operation 1330. According to an embodiment, at least part of what is related to generating operation information described above in connection with operation 1050 may apply to operation 1340.

According to an embodiment, the intelligent server (e.g., the intelligent server 200 of FIG. 1) may, in operation 1350, transmit the operation information generated in operation 1340 to the user terminal (e.g., the user terminal 100 of FIG. 1).

According to an embodiment, the intelligent server (e.g., the intelligent server 200 of FIG. 1) may first make a size comparison between the selected numbers and, depending on a result of the comparison, map a parameter predesignated according to the user's intent to each number.

Figure 14:
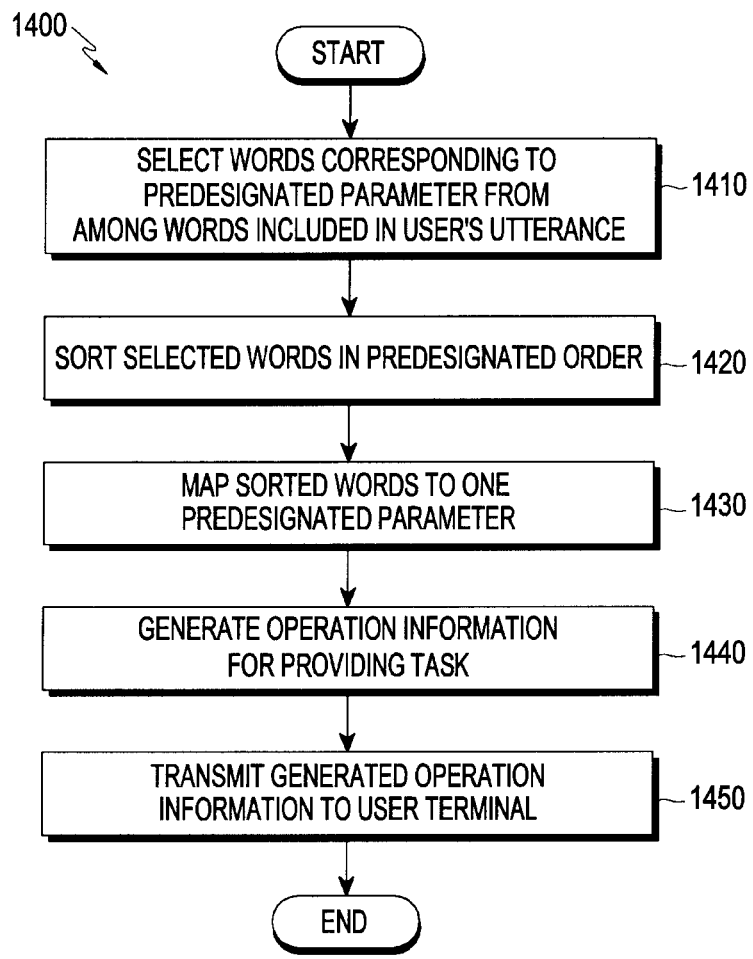

FIG. 14 illustrates example operations of performing an order relation by an intelligent server (e.g., the intelligent server 200 of FIG. 1) according to an embodiment. According to an embodiment, at least some of the operations described above in connection with FIG. 10 may likewise apply to the operations.

According to an embodiment, the intelligent server (e.g., the intelligent server 200 of FIG. 1) may select words corresponding to a predesignated parameter among words included in the user's utterance in operation 1410. According to an embodiment, operation 1410 may be appreciated as extracting parameters from the user's utterance.

According to an embodiment, the intelligent server (e.g., the intelligent server 200 of FIG. 1) may sort the selected words in a predesignated order in operation 1420. For example, according to an embodiment, the intelligent server (e.g., the intelligent server 200 of FIG. 1) may sort the selected words in the order of "5," "kilometer," and "running" so as to generate operation information.

According to an embodiment, the intelligent server (e.g., the intelligent server 200 of FIG. 1) may map the sorted words to one predesignated parameter in operation 1430. According to an embodiment, the intelligent server (e.g., the intelligent server 200 of FIG. 1) may map the words sorted in the order of "5," "kilometer," and "running" to one predesignated parameter (e.g., "ProgramName"). According to an embodiment, the intelligent server (e.g., the intelligent server 200 of FIG. 1) may map the plurality of words to one predesignated parameter so that the three words, "5," "kilometer," and "running," may be understood (e.g., processed) as a single word, e.g., "5 kilometer running."

According to an embodiment, the intelligent server (e.g., the intelligent server 200 of FIG. 1) may, in operation 1440, generate operation information for providing a task corresponding to the user's utterance based on the single parameter mapped in operation 1430. According to an embodiment, at least part of what is related to generating operation information described above in connection with operation 1050 may apply to operation 1440.

According to an embodiment, the intelligent server (e.g., the intelligent server 200 of FIG. 1) may, in operation 1450, transmit the operation information generated in operation 1440 to the user terminal (e.g., the user terminal 100 of FIG. 1).

Figure 15A:
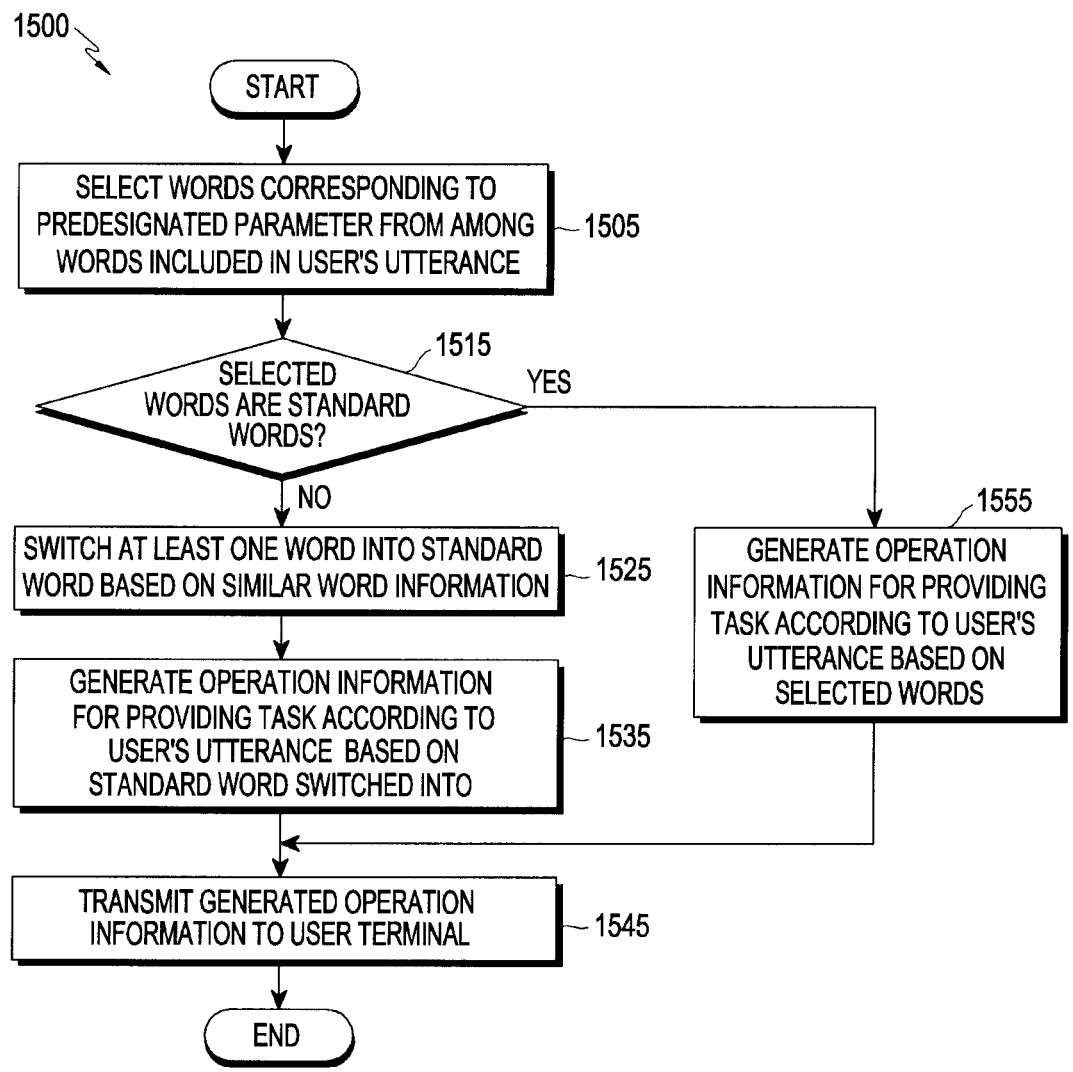

The words selected by the intelligent server (e.g., the intelligent server 200 of FIG. 1) from the user's utterance to identify the user's intent or generate operation information (e.g., a path rule) may not be standard words (or words stored in the intelligent server (e.g., the intelligent server 200 of FIG. 1)). FIG. 15A illustrates an example method 1500 of operating an intelligent server (e.g., the intelligent server 200 of FIG. 1) in such a scenario.

According to an embodiment, the intelligent server (e.g., the intelligent server 200 of FIG. 1) may select words corresponding to a predesignated parameter among words included in the user's utterance in operation 1505. According to an embodiment, operation 1505 may be appreciated as extracting parameters from the user's utterance.

According to an embodiment, the intelligent server (e.g., the intelligent server 200 of FIG. 1) may identify whether the words selected in operation 1505 are standard words in operation 1515. For example, when a selected word is "kilometer," the intelligent server (e.g., the intelligent server 200 of FIG. 1) may identify that the selected word is a standard word and, when a selected word is "kilo," the intelligent server (e.g., the intelligent server 200 of FIG. 1) may identify that the selected word is a similar word (or a non-standard word). The foregoing causes slang and abbreviated phrases to be understood. Moreover, the intelligent server may use running, which is related to distance, to determine that "kilo" means "kilometer" as opposed to "kilogram." On the other hand, if a contemporaneous word is a substance, "kilo" may be deemed "kilogram."

According to an embodiment, when at least one of the selected words is identified to be a similar word in operation 1515 ("No" in operation 1515), the intelligent server (e.g., the intelligent server 200 of FIG. 1) may switch the at least one of the selected words into a standard word based on similar word information in operation 1525. According to an embodiment, the similar word information may include a list of words (e.g., "kilo," "kiro," "kirometer," or "Km") that may correspond to the standard word. According to an embodiment, the similar word information may be stored in the intelligent server (e.g., the NLU DB 221).

According to an embodiment, the intelligent server (e.g., the intelligent server 200 of FIG. 1) may, in operation 1535, generate operation information for providing a task corresponding to the user's utterance based on the standard word switched into. According to an embodiment, at least part of what is related to generating operation information described above in connection with operation 1050 may apply to operation 1535.

According to an embodiment, the intelligent server (e.g., the intelligent server 200 of FIG. 1) may transmit the generated operation information to the user terminal (e.g., the user terminal 100 of FIG. 1) in operation 1545.

According to an embodiment, when the selected words are identified in operation 1515 to be standard words ("Yes" in operation 1515), the intelligent server (e.g., the intelligent server 200 of FIG. 1) may generate operation information for providing a task corresponding to the user's utterance based on the selected words in operation 1555. According to an embodiment, at least part of what is related to generating operation information described above in connection with operation 1050 may apply to operation 1555.

Figure 15B:
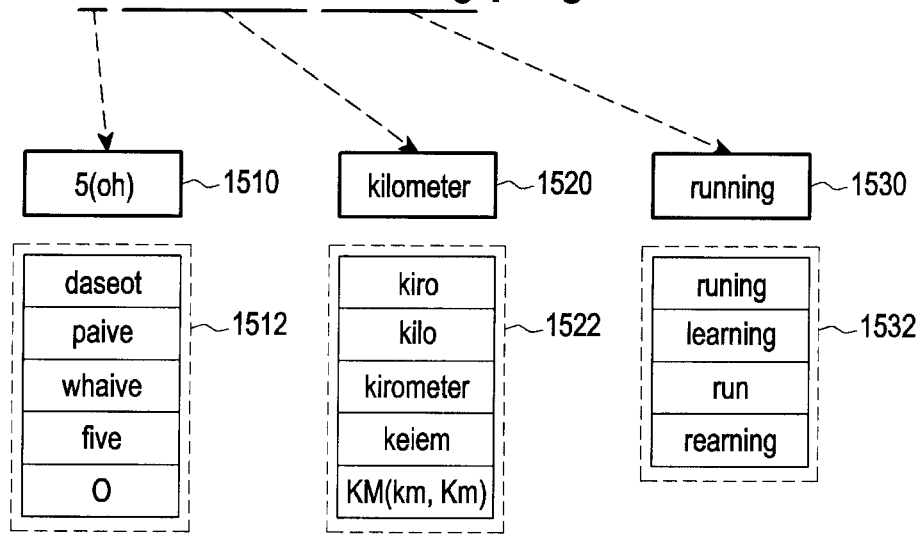
FIG. 15B is a view illustrating an operation of identifying a standard word contained in a user's utterance by an intelligent server according to an embodiment.

FIG. 15B is a view illustrating an operation of identifying a standard word included in the user's utterance by the intelligent server (e.g., the intelligent server 200 of FIG. 1) according to an embodiment. FIG. 15B illustrates an example in which all of the words included in the user's utterance (e.g., "Run 5 (or five) kilometer running program.") are standard words.

Referring to FIG. 15B, according to an embodiment, the intelligent server (e.g., the NLU module 220 of FIG. 4) may identify whether all of the words included in the user's utterance are standard words. According to an embodiment, e.g., "5 (or five)," "kilometer," and "running" may be predesignated as the standard words. According to an embodiment, when all of the words included in the user's utterance are identified to be standard words, the intelligent server (e.g., the NLU module 220 of FIG. 4) may identify whether the selected words have been entered in a predesignated order (e.g., "Distance"→"Unit"→"Event") of parameters each of which corresponds to a respective one of the standard words. According to an embodiment, when the selected words are identified to have been entered in the designated order, the intelligent server (e.g., the NLU module 220 of FIG. 4) may map the selected words to a single parameter (e.g., "ProgramName"). According to an embodiment, the intelligent server (e.g., the NLU module 220 or path planner module 230 of FIG. 4) may generate operation information based on the plurality of words mapped to the single parameter.

According to an embodiment, similar word lists 1512, 1522, and 1532 respectively corresponding to the standard words 1510, 1520, and 1530 may previously be stored in the intelligent server (e.g., the intelligent server 200 of FIG. 1). The user may oftentimes shorten or omit one or more words in practical speaking situations. In order to reflect such a user speaking pattern, it is possible to store phrases (i.e., not single-word units) reflecting the user's real speaking pattern according to a predesignated order (e.g., "Distance- "→"Unit"→"Event"), which compares the user's utterance entered with the phrases stored, and generates operation information. To generate operation information for providing a particular task (e.g., run "5 kilometer running program"), the it is possible to store such phrases as "5 kilometer running," "5 kilo running," or "5 km running," as similar phrases, as well as "5 kilometer running." When the user's utterance "5 kilo running" is entered, the intelligent server processes the user's utterance to understand the entered utterance as "5 kilometer running."

However, according to an embodiment, the intelligent server (e.g., the intelligent server 200 of FIG. 1) may previously store similar word lists predesignated in word units and determine on a per-word basis whether each word corresponds to a standard word as shown in FIG. 15B, rather than by comparing entire phrases. As compared with comparing entire phrases, the instant approach may conserver resources of the intelligent server (e.g., the intelligent server 200 of FIG. 1) and lead to consideration of more word combinations. For example, five similar words (e.g., "daseot," "paive," "whaive," "five," and "0" which are common ways to say the number 5 in Korean and may be considered non-standard) may previously be designated corresponding to "5." According to an embodiment, five similar words (e.g., "kiro," "kilo," "kirometer," "keiem," and "KM (Km or km)" may previously be designated for "kilometer." According to an embodiment, four similar words (e.g., "runing," "learning," "run," and "rearning") may previously be designated for "running." Accordingly, 100 phrases (5×5×4) may be generated according to an embodiment. However, the kinds of similar words included in the similar word lists 1512, 1522, and 1532 as shown in FIG. 15B are provided merely as an example, and embodiments of the disclosure are not limited thereto. As used herein, the term "similar word" may be interchangeably used with the term "non-standard word."

Figure 15C:
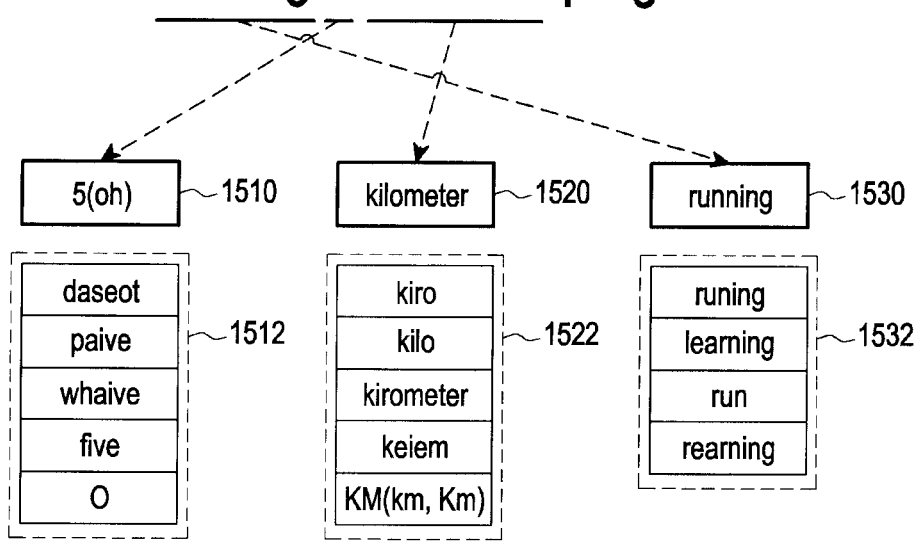
FIG. 15C is a view illustrating an example operation of sorting selected words in a designated order regardless of the order of words contained in a user's utterance to generate operation information, by an intelligent server, according to an embodiment.

FIG. 15C is a view illustrating an example operation of sorting words selected from the user's utterance in a designated order to generate operation information by an intelligent server (e.g., the intelligent server 200 of FIG. 1), according to an embodiment.

Referring to FIG. 15C, according to an embodiment, the intelligent server (e.g., the NLU module 220 of FIG. 4) may identify that words selected from the user's utterance have not been entered according to a predesignated order. In this case, the intelligent server (e.g., the NLU module 220 of FIG. 4) may sort the words selected from the user's utterance in the predesignated order according to an embodiment. According to an embodiment, the intelligent server (e.g., the NLU module 220 or path planner module 230 of FIG. 4) may generate operation information based on the sorted words.

Figure 15D:
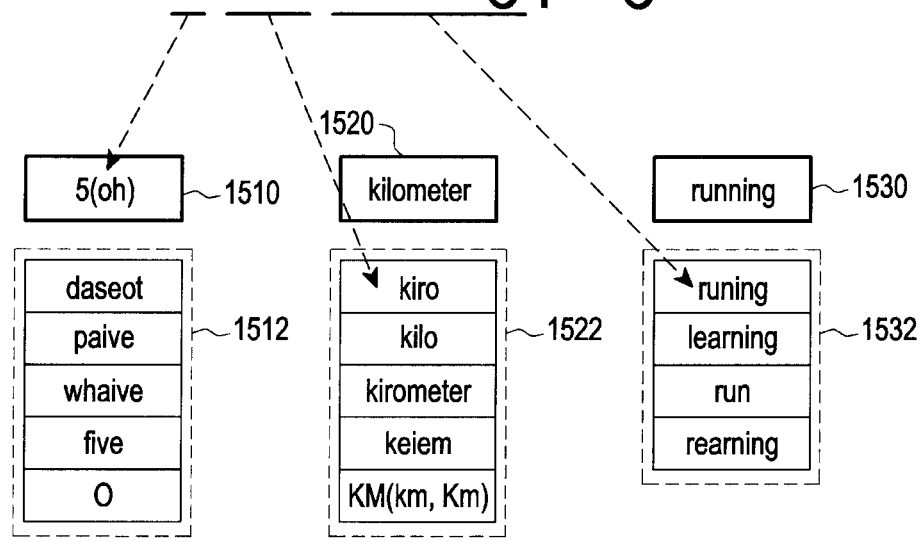
FIG. 15D is a view illustrating an example operation of generating operation information by converting a similar word into a standard word when a user's utterance contains the similar word, according to an embodiment.

FIG. 15D is a view illustrating an example operation of generating operation information by converting a non-standard word into a standard word when a user's utterance contains the non-standard word, "kilo", according to an embodiment.

Referring to FIG. 15D, according to an embodiment, when the user's utterance is identified to contain non-standard words, the intelligent server (e.g., the NLU module 220 or path planner module 230 of FIG. 4) may switch words selected from the user's utterance into standard words 1510, 1520, and 1530 and sort the standard words switched into in a predesignated order. According to an embodiment, the intelligent server (e.g., the NLU module 220 or path planner module 230 of FIG. 4) may generate operation information based on the sorted words.

According to an embodiment, the intelligent server (e.g., the intelligent server 200 of FIG. 1) may generate operation information for the user terminal (e.g., the user terminal 100 of FIG. 1) to perform computation based on, at least, certain embodiments, described above in connection with FIGS. 15A to 15D. For example, when the user terminal (e.g., the user terminal 100 of FIG. 1) receives the user's utterance "calculate 5 plus 3 minus 7 multiplied by 6," the intelligent server (e.g., the NLU module 220 of FIG. 4) may convert "calculate 5 plus 3 minus 7 multiplied by 6" into "5+3−7×6" and generate operation information. According to an embodiment, the intelligent server (e.g., the intelligent server 200 of FIG. 1) may previously store "+" as a standard word for "plus." According to an embodiment, the intelligent server (e.g., the intelligent server 200 of FIG. 1) may previously store "−" as a standard word for "minus." According to an embodiment, the intelligent server (e.g., the intelligent server 200 of FIG. 1) may previously store "x" as a standard word for "multiplied by."

FIGS. 16A to 16D are views illustrating example methods 1600, 1610, 1620, and 1630 of operating an intelligent server (e.g., the intelligent server 200 of FIG. 1) or the integrated intelligence system 10 when a mandatory word is missing from the user's utterance according to an embodiment.

Figure 16A:
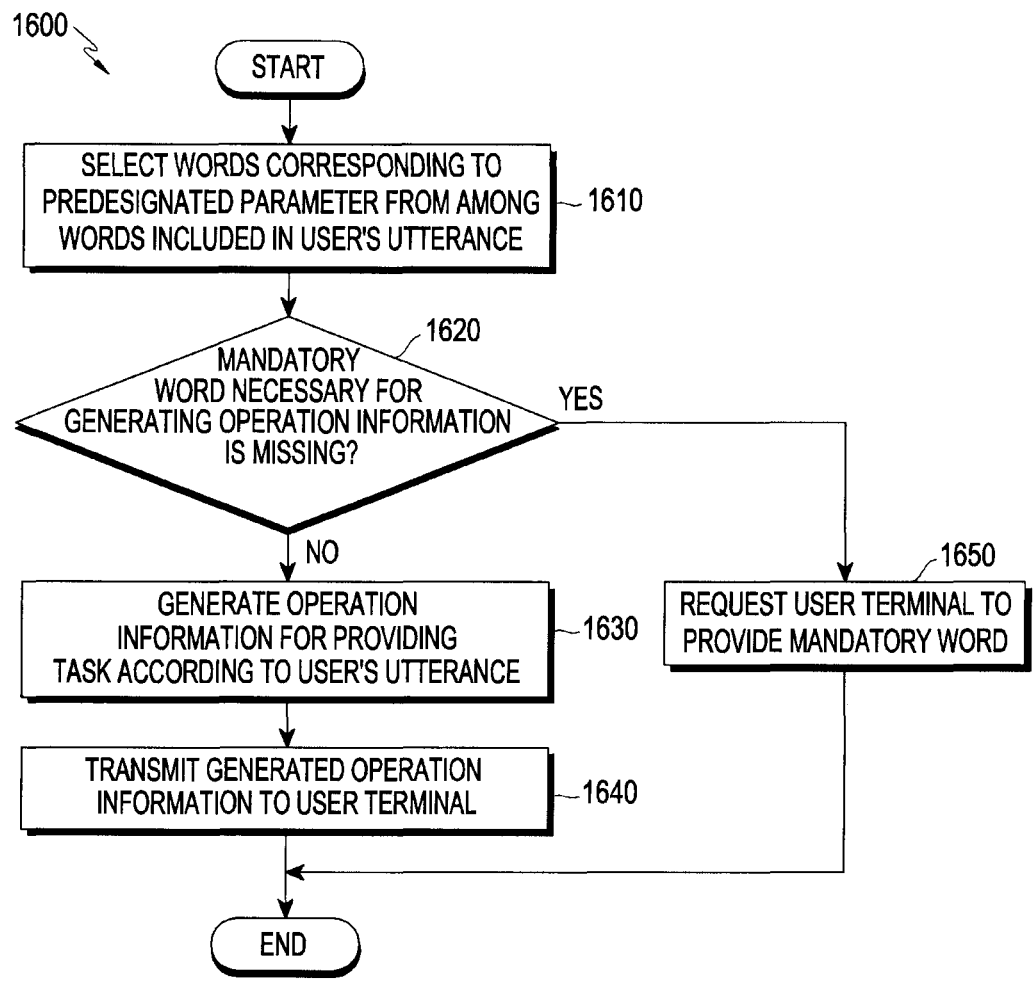
FIG. 16A, FIG. 16B, FIG. 16C, and FIG. 16D are views illustrating an example method of operating an integrated intelligence system or an intelligent server when a mandatory word is missing from a utterance's utterance according to an embodiment.

Referring to FIG. 16A, according to an embodiment, the intelligent server (e.g., the intelligent server 200 of FIG. 1) may select words corresponding to a predesignated parameter from among words included in the user's utterance in operation 1610. For example, when the user terminal (e.g., the user terminal 100 of FIG. 1) receives the user's utterance "I ate one bowl and one apple for breakfast. Save it," the intelligent server (e.g., the intelligent server 200 of FIG. 1) may select "breakfast," "one bowl," "apple," and "one," which correspond to a particular parameter, of the user's utterance, according to an embodiment. According to an embodiment, operation 1610 may be appreciated as extracting parameters from the user's utterance.

According to an embodiment, the intelligent server (e.g., the intelligent server 200 of FIG. 1) may identify whether a mandatory word necessary to generate operation information is missing in operation 1620. According to an embodiment, the intelligent server (e.g., the NLU module 220 of FIG. 4) may identify that what the "one bowl" is about (e.g., "soybean soup") is missing from the words selected from the user's utterance. According to an embodiment, what the "one bowl" is about may be a mandatory word in generating operation information for providing a task according to the user's utterance.

According to an embodiment, upon identifying that all of the mandatory words are identified in operation 1620 to be included ("No" in operation 1620), the intelligent server (e.g., the NLU module 220 or path planner module 230 of FIG. 4) may generate operation information for providing a task according to the user's utterance based on the selected words in operation 1630. According to an embodiment, at least part of what is related to generating operation information described above in connection with operation 1050 may apply to operation 1630.

According to an embodiment, the intelligent server (e.g., the intelligent server 200 of FIG. 1) may transmit the generated operation information to the user terminal (e.g., the user terminal 100 of FIG. 1) in operation 1640.

According to an embodiment, upon identifying that at least one mandatory word is identified in operation 1620 to be missing ("Yes" in operation 1620), the intelligent server (e.g., the NLU module 220 or path planner module 230 of FIG. 4) may send a request for the mandatory word to the user terminal (e.g., the user terminal 100 of FIG. 1).

Figure 16B:
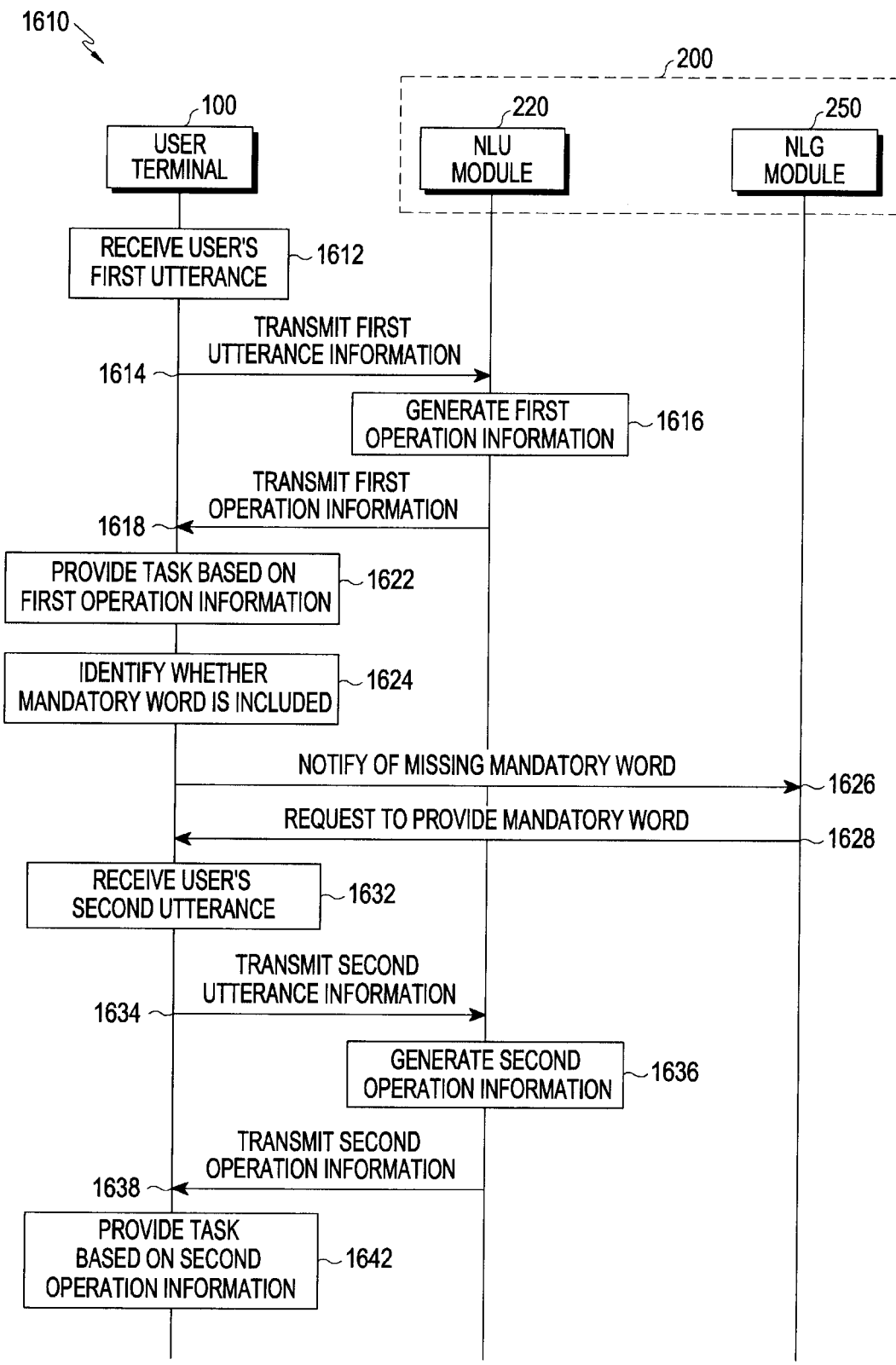

Referring to FIG. 16B, according to an embodiment, the user terminal 100 may receive the user's first utterance (e.g., "I ate one bowl and one apple for breakfast. Save it.") in operation 1612.

According to an embodiment, the user terminal 100 may transmit information about the received first utterance to the intelligent server 200 (e.g., the NLU module 220) in operation 1614.

According to an embodiment, the intelligent server 200 (e.g., the NLU module 220) may generate first operation information for providing a task according to the user's utterance based on the information about the first utterance which has been received from the user terminal 100 in operation 1616. According to an embodiment, the first operation information may contain operation information generated based on an utterance from which at least one mandatory word (e.g., "soybean soup") is missing.

According to an embodiment, the intelligent server 200 (e.g., the NLU module 220) may, in operation 1618, transmit the first operation information generated in operation 1616 to the user terminal 100.

According to an embodiment, the user terminal 100 may, in operation 1622, provide a task (e.g., display an execution screen of an application according to the first operation information on the user terminal 100) based on the first operation information received from the intelligent server 200 (e.g., the NLU module 220).

According to an embodiment, the user terminal 100 may, in operation 1624, identify whether mandatory words (or mandatory parameters) are included (or missing) while providing the task in operation 1622. According to an embodiment, the first utterance may be an utterance from which a mandatory word (e.g., "soybean soup") is missing, and the user terminal 100 may identify that the first utterance is an utterance from which the mandatory word is missing in operation 1624.

According to an embodiment, the user terminal 100 may, in operation 1626, notify the intelligent server 200 (e.g., the NLG module 250) that the mandatory word is missing. According to an embodiment, the user terminal 100 may transmit a notification related to the mandatory word missing to the NLU module 220. In this case, the NLU module 220 may transmit the notification received from the user terminal 100 to the NLG module 250, according to an embodiment.

According to an embodiment, the intelligent server 200 (e.g., the NLG module 250) may request the user terminal 100 to provide the missing mandatory word in operation 1628.

According to an embodiment, the user terminal 100 may, in operation 1632, receive the user's second utterance (e.g., "I ate one bowl of soybean soup and one apple for breakfast. Save it.") containing the mandatory word at the request of the intelligent server 200 (e.g., the NLG module 250) in operation 1628. According to an embodiment, the user terminal 100 may, in operation 1632, output (e.g., in a voice) a notification message to request reentry of a mandatory word-containing utterance to receive the second utterance from the user.

However, according to an embodiment, operations 1626 and 1628 may be omitted. In this case, operation 1632 may be performed by the user terminal 100 without any request from the intelligent server 200, according to an embodiment.

According to an embodiment, the user terminal 100 may transmit information about the second utterance received from the user to the intelligent service 200 (e.g., the NLU module 220) in operation 1634.

According to an embodiment, the intelligent server 200 (e.g., the NLU module 220) may generate second operation information for providing a task according to the user's utterance based on the information about the second utterance received from the user in operation 1636. According to an embodiment, the second operation information may contain operation information generated based on an utterance containing at least one mandatory word (e.g., "soybean soup").

According to an embodiment, the intelligent server 200 (e.g., the NLU module 220) may, in operation 1638, transmit the second operation information generated in operation 1636 to the user terminal 100.

According to an embodiment, the user terminal 100 may provide a task (e.g., display an execution screen including breakfast information contained in the user's second utterance on the display or store the breakfast information contained in the second utterance in the user terminal 100) based on the second operation information in operation 1642.

Figure 16C:
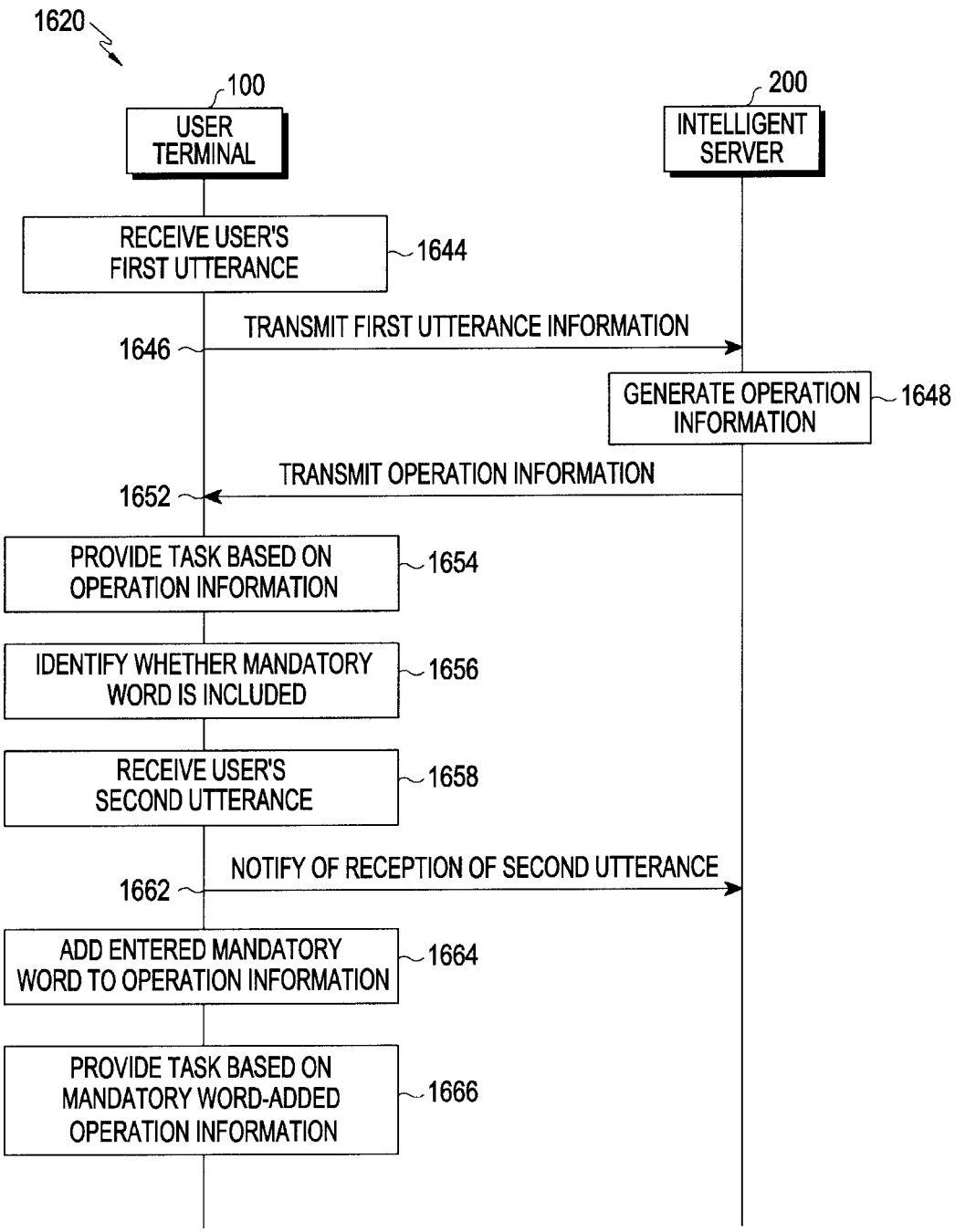

FIG. 16C illustrates an example of updating operation information by the user terminal 100 upon receiving, from the user, a second utterance containing the mandatory word which is missing from the first utterance. According to an embodiment, the description of operations 1612 to 1624 made above in connection with FIG. 16B may at least partially apply to operations 1644 to 1656 of FIG. 16C.

According to an embodiment, the user terminal 100 may, in operation 1658, may receive the user's second utterance containing mandatory words (e.g., "I ate one bowl of soybean soup and one apple for breakfast. Save it,"). According to an embodiment, the user terminal 100 may, in operation 1658, output (e.g., in a voice) a notification message to request reentry of a mandatory word-containing utterance to receive the second utterance from the user.

According to an embodiment, the user terminal 100 may, in operation 1662, transmit a notification of reception of the second utterance, e.g., a notification indicating that the user's utterance containing the missing mandatory word is obtained, to the intelligent server 200 (e.g., the NLU module 220). According to an embodiment, operation 1662 may be performed simultaneously with or after operation 1666. Alternatively, operation 1662 may be omitted.

According to an embodiment, the user terminal 100 may add the mandatory word entered from the user to the operation information (or update the operation information) in operation 1664. For example, according to an embodiment, the user terminal 100 may update the operation information so that information about the mandatory word (e.g., "soybean soup") contained in the second utterance is included in the operation information received from the intelligent server 200 (e.g., the NLU module 220).

According to an embodiment, the user terminal 100 may, in operation 1666, provide a task (e.g., display an execution screen including breakfast information contained in the user's second utterance or store the breakfast information contained in the second utterance in the user terminal 100) based on the operation information updated in operation 1664.

Figure 16D:
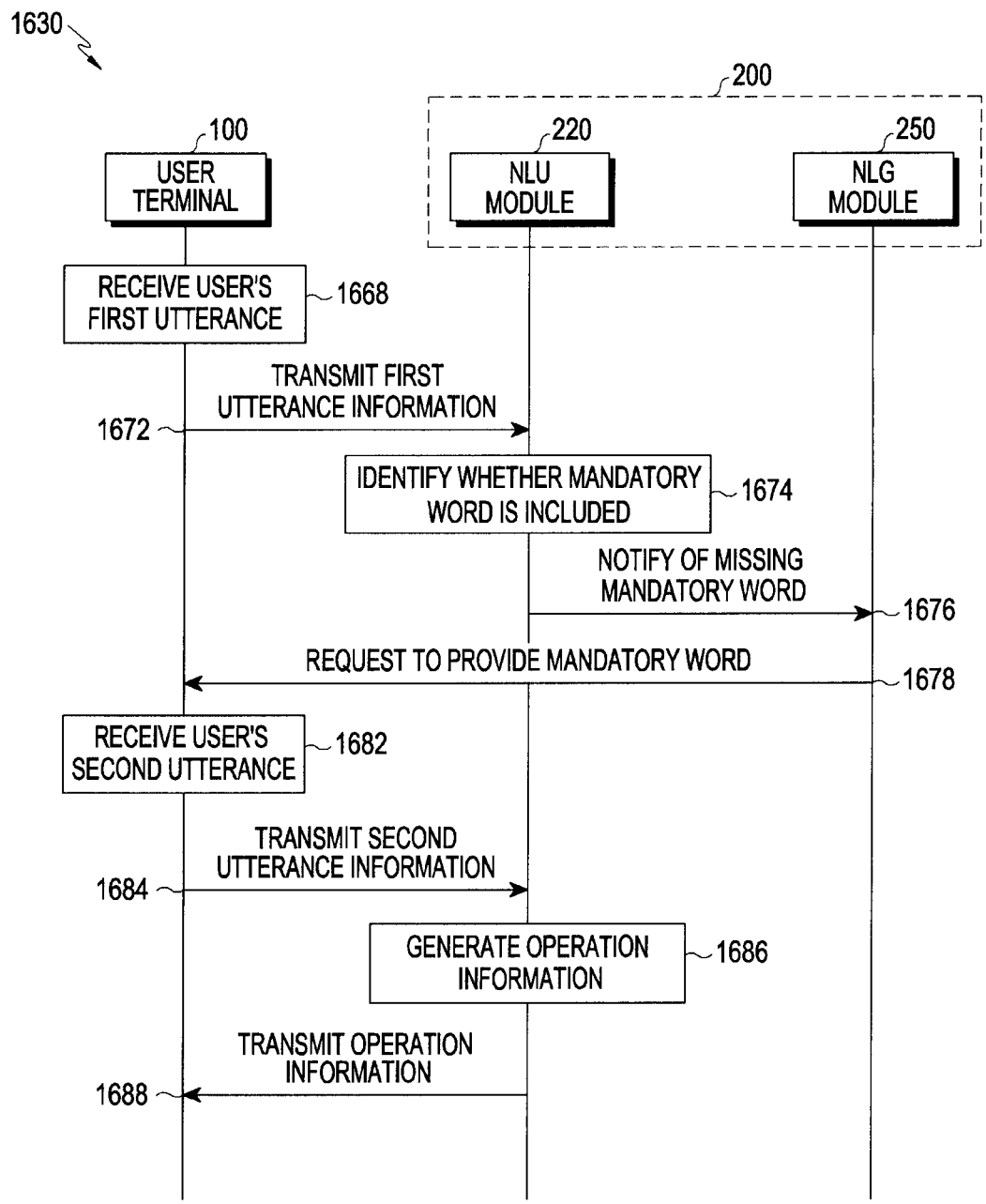

FIG. 16D illustrates an example of identifying whether the user's utterance contains mandatory words by the intelligent server 200 (e.g., the NLU module 220).

Referring to FIG. 16D, according to an embodiment, the user terminal 100 may receive the user's first utterance in operation 1668.

According to an embodiment, the user terminal 100 may transmit information about the received first utterance to the intelligent server 200 (e.g., the NLU module 220) in operation 1672.

According to an embodiment, the intelligent server 200 (the NLU module 220) may identify whether the user's first utterance contains mandatory words for generating operation information in operation 1674.

According to an embodiment, when a mandatory word for generating operation information is identified to be missing from the user's first utterance, the intelligent server 200 (the NLU module 220) may notify the NLG module 250 that the mandatory word is missing in operation 1676.

According to an embodiment, the intelligent server 200 (e.g., the NLG module 250) may request the user terminal 100 to provide the mandatory word in operation 1678.

According to an embodiment, the user terminal 100 may receive a second utterance from the user in operation 1682. According to an embodiment, the user terminal 100 may, in operation 1682, output (e.g., in a voice) a notification message to request reentry of an utterance to receive the second utterance from the user.

According to an embodiment, the user terminal 100 may transmit information about the second utterance received from the user to the intelligent service 200 (e.g., the NLU module 220) in operation 1684.

According to an embodiment, the intelligent server 200 (e.g., the NLU module 220) may generate operation information for providing a task according to the user's utterance based on the information about the received second utterance in operation 1686.

According to an embodiment, the intelligent server 200 (the NLU module 220) may transmit the generated operation information to the user terminal 100 in operation 1688.

Although FIG. 16D illustrates that operation 1674 is performed by the NLU module 220, this is merely an example. For example, operation 1674 may be performed by at least some other device or component of the integrated intelligence system (e.g., the integrated intelligence system 10 of FIG. 1) according to an embodiment. According to an embodiment, operation 1678 may also be performed by at least some other device or component of the integrated intelligence system (e.g., the integrated intelligence system 10 of FIG. 1).

Figure 17A:
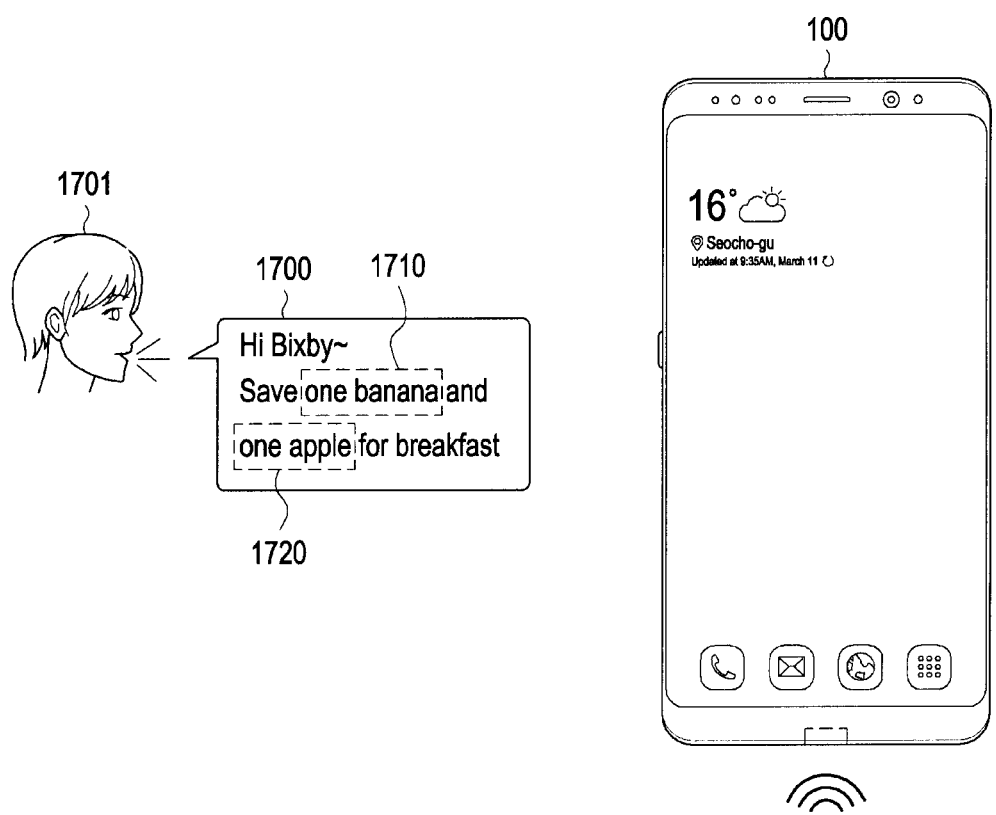
FIG. 17A and FIG. 17B are views illustrating example screens displayed on a user terminal depending on operation information generated based on entry of a user's utterance according to an embodiment.
Figure 17B:
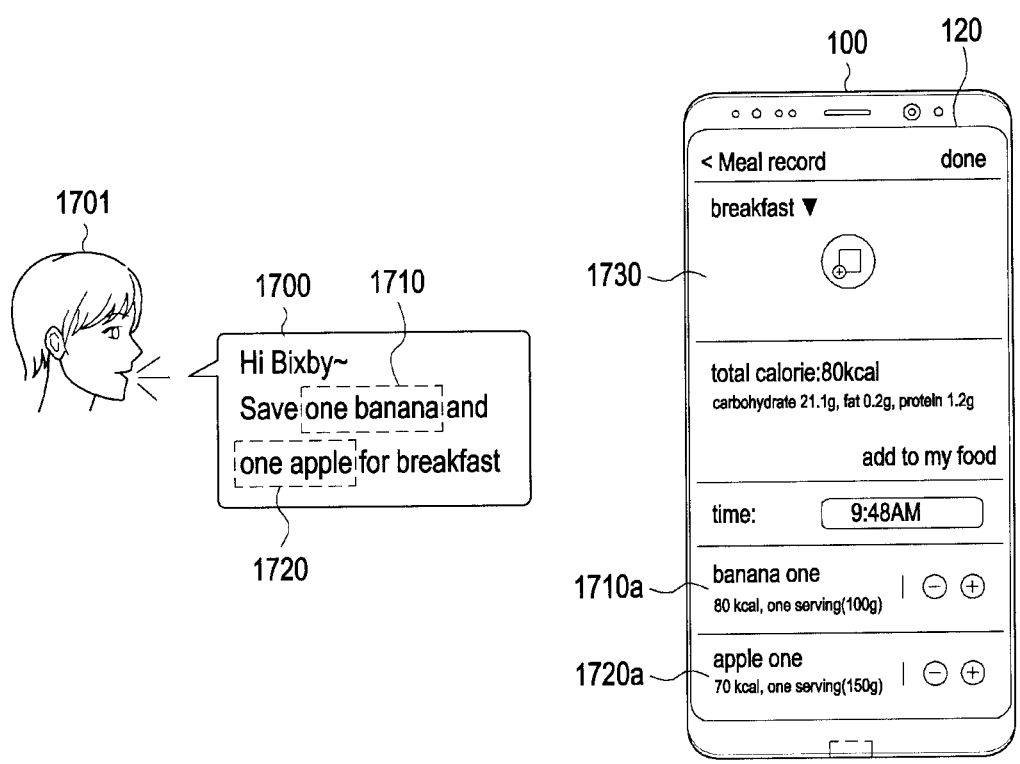

FIGS. 17A and 17B are views illustrating example screens displayed on a user terminal 100 depending on operation information generated based on entry of a user's utterance according to an embodiment.

Referring to FIG. 17A, the user terminal 100 may receive, from a user 1701, an utterance 1700 containing a first word set 1710 and a second word set 1720 including a plurality of words with relevance. According to an embodiment, the user's utterance 1700 may include a wake-up word or phrase (e.g., Hi Bixby.) to invoke an intelligent service.

According to an embodiment, the user terminal 100 may provide a task according to the user's utterance based on operation information (e.g., a path rule) received from an intelligent server (e.g., the intelligent server 200 of FIG. 2) and output (e.g., display) a result of performing the task. Referring to FIG. 17B, according to an embodiment, the user terminal 100 may output, on the display 120, a screen 1730 for a result of performing a task reflecting the user's intent. According to an embodiment, the screen 1730 may include at least part 1710a and 1720b of the result of performing the task, which is separately stored (e.g., "one banana" and "one apple") depending on semantic groups.

Figure 18:
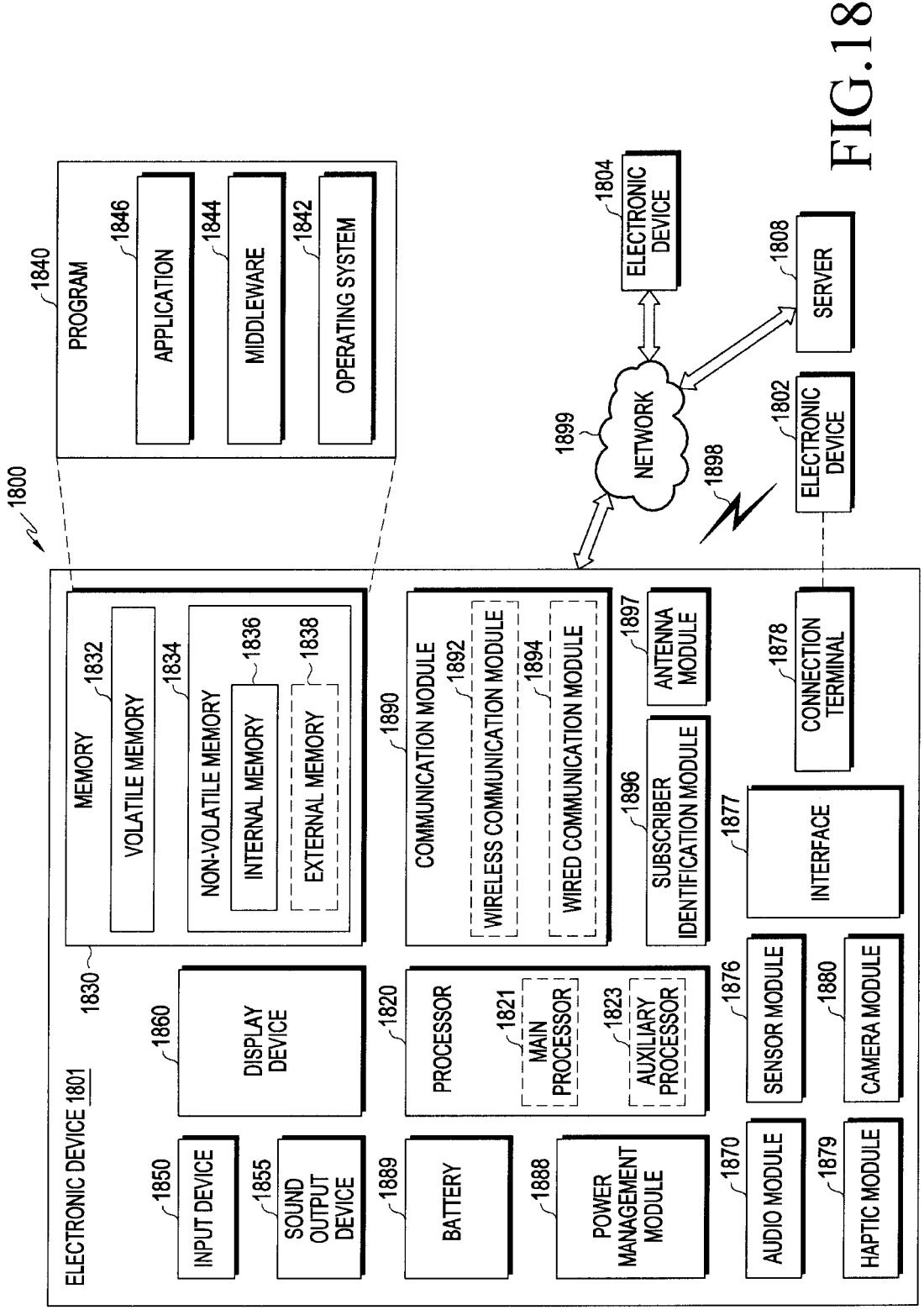
FIG. 18 is a view illustrating an example electronic device according to an embodiment.

FIG. 18 is a view illustrating an example electronic device (e.g., the user terminal 100 of FIG. 1) according to an embodiment.

FIG. 18 is a block diagram illustrating an electronic device 1801 in a network environment 1800 according to certain embodiments. Referring to FIG. 18, the electronic device 1801 in the network environment 1800 may communicate with an electronic device 1802 via a first network 1898 (e.g., a short-range wireless communication network), or an electronic device 1804 or a server 1808 via a second network 1899 (e.g., a long-range wireless communication network). According to an embodiment, the electronic device 1801 may communicate with the electronic device 1804 via the server 1808. According to an embodiment, the electronic device 1801 may include a processor 1820, memory 1830, an input device 1850, a sound output device 1855, a display device 1860, an audio module 1870, a sensor module 1876, an interface 1877, a haptic module 1879, a camera module 1880, a power management module 1888, a battery 1889, a communication module 1890, a subscriber identification module (SIM) 1896, or an antenna module 1897. In some embodiments, at least one (e.g., the display device 1860 or the camera module 1880) of the components may be omitted from the electronic device 1801, or one or more other components may be added in the electronic device 101. In some embodiments, some of the components may be implemented as single integrated circuitry. For example, the sensor module 1876 (e.g., a fingerprint sensor, an iris sensor, or an illuminance sensor) may be implemented as embedded in the display device 1860 (e.g., a display).

The processor 1820 may execute, for example, software (e.g., a program 1840) to control at least one other component (e.g., a hardware or software component) of the electronic device 1801 coupled with the processor 1820, and may perform various data processing or computation. According to one embodiment, as at least part of the data processing or computation, the processor 1820 may load a command or data received from another component (e.g., the sensor module 1876 or the communication module 1890) in volatile memory 1832, process the command or the data stored in the volatile memory 1832, and store resulting data in non-volatile memory 1834. According to an embodiment, the processor 1820 may include a main processor 1821 (e.g., a central processing unit (CPU) or an application processor (AP)), and an auxiliary processor 1823 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 1823 may be adapted to consume less power than the main processor 1821, or to be specific to a specified function. The auxiliary processor 1823 may be implemented as separate from, or as part of the main processor 1821.

The auxiliary processor 1823 may control at least some of functions or states related to at least one component (e.g., the display device 1860, the sensor module 1876, or the communication module 1890) among the components of the electronic device 1801, instead of the main processor 1821 while the main processor 1821 is in an inactive (e.g., sleep) state, or together with the main processor 1821 while the main processor 1821 is in an active state (e.g., executing an application). According to an embodiment, the auxiliary processor 1823 (e.g., an image signal processor or a communication processor) may be implemented as part of another component (e.g., the camera module 1880 or the communication module 1890) functionally related to the auxiliary processor 123.

The memory 1830 may store various data used by at least one component (e.g., the processor 1820 or the sensor module 1876) of the electronic device 1801. The various data may include, for example, software (e.g., the program 1840) and input data or output data for a command related thereto. The memory 1830 may include the volatile memory 1832 or the non-volatile memory 1834.

The program 1840 may be stored in the memory 1830 as software, and may include, for example, an operating system (OS) 1842, middleware 1844, or an application 1846.

The input device 1850 may receive a command or data to be used by other component (e.g., the processor 1820) of the electronic device 1801, from the outside (e.g., a user) of the electronic device 1801. The input device 1850 may include, for example, a microphone, a mouse, or a keyboard.

The sound output device 1855 may output sound signals to the outside of the electronic device 1801. The sound output device 1855 may include, for example, a speaker or a receiver. The speaker may be used for general purposes, such as playing multimedia or playing record, and the receiver may be used for an incoming calls. According to an embodiment, the receiver may be implemented as separate from or as a part of the speaker.

The display device 1860 may visually provide information to the outside (e.g., a user) of the electronic device 1801. The display device 1860 may include, for example, a display, a hologram device, or a projector and control circuitry to control a corresponding one of the display, hologram device, and projector. According to an embodiment, the display device 1860 may include touch circuitry adapted to detect a touch, or sensor circuitry (e.g., a pressure sensor) adapted to measure the intensity of force incurred by the touch.

The audio module 1870 may convert a sound into an electrical signal and vice versa. According to an embodiment, the audio module 1870 may obtain the sound via the input device 1850, or output the sound via the sound output device 1855 or a headphone of an external electronic device (e.g., an electronic device 1802) directly (e.g., wiredly) or wirelessly coupled with the electronic device 1801.

The sensor module 1876 may detect an operational state (e.g., power or temperature) of the electronic device 1801 or an environmental state (e.g., a state of a user) external to the electronic device 1801, and then generate an electrical signal or data value corresponding to the detected state. According to an embodiment, the sensor module 1876 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1877 may support one or more specified protocols to be used for the electronic device 1801 to be coupled with the external electronic device (e.g., the electronic device 1802) directly (e.g., wiredly) or wirelessly. According to an embodiment, the interface 1877 may include, for example, a high definition multimedia interface (HDMI), a universal serial bus (USB) interface, a secure digital (SD) card interface, or an audio interface.

A connecting terminal 1878 may include a connector via which the electronic device 1801 may be physically connected with the external electronic device (e.g., the electronic device 1802). According to an embodiment, the connecting terminal 1878 may include, for example, a HDMI connector, a USB connector, a SD card connector, or an audio connector (e.g., a headphone connector).

The haptic module 1879 may convert an electrical signal into a mechanical stimulus (e.g., a vibration or motion) or electrical stimulus which may be recognized by a user via his tactile sensation or kinesthetic sensation. According to an embodiment, the haptic module 1879 may include, for example, a motor, a piezoelectric element, or an electric stimulator.

The camera module 1880 may capture a still image or moving images. According to an embodiment, the camera module 1880 may include one or more lenses, image sensors, image signal processors, or flashes.

The power management module 1888 may manage power supplied to the electronic device 1801. According to one embodiment, the power management module 388 may be implemented as at least part of, for example, a power management integrated circuit (PMIC).

The battery 1889 may supply power to at least one component of the electronic device 1801. According to an embodiment, the battery 1889 may include, for example, a primary cell which is not rechargeable, a secondary cell which is rechargeable, or a fuel cell.

The communication module 1890 may support establishing a direct (e.g., wired) communication channel or a wireless communication channel between the electronic device 1801 and the external electronic device (e.g., the electronic device 1802, the electronic device 1804, or the server 1808) and performing communication via the established communication channel. The communication module 1890 may include one or more communication processors that are operable independently from the processor 1820 (e.g., the application processor (AP)) and supports a direct (e.g., wired) communication or a wireless communication. According to an embodiment, the communication module 1890 may include a wireless communication module 1892 (e.g., a cellular communication module, a short-range wireless communication module, or a global navigation satellite system (GNSS) communication module) or a wired communication module 1894 (e.g., a local area network (LAN) communication module or a power line communication (PLC) module). A corresponding one of these communication modules may communicate with the external electronic device via the first network 1898 (e.g., a short-range communication network, such as Bluetooth™, wireless-fidelity (Wi-Fi) direct, or infrared data association (IrDA)) or the second network 1899 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1892 may identify and authenticate the electronic device 1801 in a communication network, such as the first network 1898 or the second network 1899, using subscriber information (e.g., international mobile subscriber identity (IMSI)) stored in the subscriber identification module 1896.

The antenna module 1897 may transmit or receive a signal or power to or from the outside (e.g., the external electronic device). According to an embodiment, the antenna module 1897 may include one or more antennas, and, therefrom, at least one antenna appropriate for a communication scheme used in the communication network, such as the first network 1898 or the second network 1899, may be selected, for example, by the communication module 1890. The signal or the power may then be transmitted or received between the communication module 1890 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1801 and the external electronic device 1804 via the server 1808 coupled with the second network 1899. Each of the electronic devices 1802 and 1804 may be a device of a same type as, or a different type, from the electronic device 1801. According to an embodiment, all or some of operations to be executed at the electronic device 1801 may be executed at one or more of the external electronic devices 1802, 1804, or 1808. For example, if the electronic device 1801 should perform a function or a service automatically, or in response to a request from a user or another device, the electronic device 1801, instead of, or in addition to, executing the function or the service, may request the one or more external electronic devices to perform at least part of the function or the service. The one or more external electronic devices receiving the request may perform at least part of the function or the service requested, or an additional function or an additional service related to the request and transfer an outcome of the performance to the electronic device 1801. The electronic device 1801 may provide the outcome, with or without further processing of the outcome, as at least part of a reply to the request. To that end, a cloud computing, distributed computing, or client-server computing technology may be used, for example.

Figure 19:
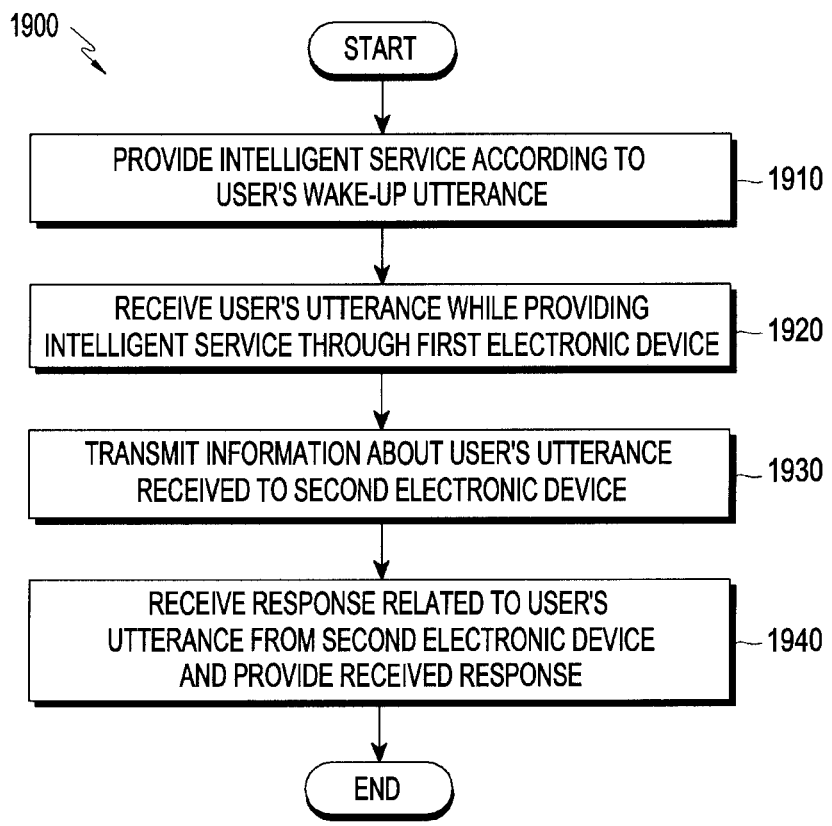
FIG. 19 is a view illustrating an example method of operating an electronic device according to an embodiment.

FIG. 19 is a view illustrating a method 1900 of operating a first electronic device (e.g., the user terminal 100 of FIG. 1) according to an embodiment.

Referring to FIG. 19, according to an embodiment, a method of operating a first electronic device (e.g., the user terminal 100 of FIG. 1) may provide an intelligent service according to a user's wake-up utterance in operation 1910.

According to an embodiment, the method of operating the first electronic device (e.g., the user terminal 100 of FIG. 1) may receive the user's utterance while providing the intelligent service through the first electronic device in operation 1920.

According to an embodiment, the method of operating the first electronic device (e.g., the user terminal 100 of FIG. 1) may transmit information about the user's utterance received to a second electronic device in operation 1930.

According to an embodiment, the method of operating the first electronic device (e.g., the user terminal 100 of FIG. 1) may receive a response related to the user's utterance from the second electronic device and provide the received response in operation 1940.

According to an embodiment, an integrated intelligence system comprises a first electronic device including a communication circuit and a microphone, at least one processor being part of the first electronic device or configured to remotely communicate with the first electronic device, and a memory positioned on or outside the first electronic device and operatively connected with the at least one processor, wherein the memory may store instructions executed to enable the at least one processor to provide an intelligent service according to a user's input, receive the user's utterance through the microphone while the intelligent service is provided through the first electronic device, the user's utterance including at least one first word set including a plurality of words with predesignated relevance, transmit information about the user's utterance received, to a second electronic device via the communication circuit, and receive a response related to the user's utterance from the second electronic device in response to the transmission and provide the received response.

According to an embodiment, the user's utterance may further include at least one word lacking the predesignated relevance with the first word set. The second electronic device may include an instruction configured to distinguish the first word set from the at least one word in different semantic groups.

According to an embodiment, a plurality of words included in the first word set may include at least two or more words differing from each other and corresponding to a predesignated parameter. The second electronic device may include an instruction configured to set the at least two or more words as words included in a single semantic group.

According to an embodiment, the second electronic device may include an instruction configured to determine whether the user's utterance includes a plurality of words corresponding to a predesignated parameter.

According to an embodiment, the user's utterance may further include a second word set including a plurality of words differing from the plurality of words and having the predesignated relevance. The second electronic device may include an instruction configured to distinguish the first word set and the second word set in different semantic groups.

According to an embodiment, at least one of a plurality of words included in the first word set and at least one of a plurality of words included in the second word set may correspond to the same parameter.

According to an embodiment, the predesignated parameter may include a first parameter, a second parameter, and a third parameter which have a hierarchy. A plurality of words included in the first word set may include words each of which correspond to a respective one of at least two or more of the first parameter, the second parameter, and the third parameter.

According to an embodiment, the predesignated relevance may include at least one of a linking relation, a logical operation relation, and an order relation between parameters each of which corresponds to a respective one of the plurality of words.

According to an embodiment, the second electronic device may include an instruction configured to determine whether the predesignated relevance is the linking relation, the logical operation relation, and the order relation, and when the predesignated relevance is the logical operation relation, compare sizes of at least two or more numbers included in the user's utterance, and determine a parameter for each of the numbers based on a result of the comparison.

According to an embodiment, the second electronic device may further include an instruction configured to determine whether the predesignated relevance is the linking relation, the logical operation relation, and the order relation, and when the predesignated relevance is the order relation, sort words selected from among a plurality of words included in the user's utterance in a predesignated order, and map the selected words to a predesignated parameter.

According to an embodiment, the second electronic device may include an instruction configured to convert the words selected from among the plurality of words included in the user's utterance into predesignated standard words based on a similar word list stored in the second electronic device.

According to an embodiment, the user's utterance may include a first utterance and a second utterance. The second electronic device may include an instruction configured to map at least one word selected from the first utterance to at least one of the parameters determined according to the user's intent of the second utterance. The at least one word selected from the first utterance may not be included in the second utterance.

According to an embodiment, a control method in an integrated intelligence system comprises providing an intelligent service according to a user's request, receiving the user's utterance through a microphone of a first electronic device while the intelligent service is provided through the first electronic device, the user's utterance including at least one first word set including a plurality of words with predesignated relevance, transmitting information about the user's utterance received, to a second electronic device via a communication circuit of the first electronic device, and receiving a response related to the user's utterance from the second electronic device in response to the transmission and providing the received response.

According to an embodiment, there may be provided a computer-readable recording medium storing instructions configured to perform at least one operation by a processor, the at least one operation comprising providing an intelligent service according to a user's request, receiving the user's utterance through a microphone of a first electronic device while the intelligent service is provided through the first electronic device, the user's utterance including at least one first word set including a plurality of words with predesignated relevance, transmitting information about the user's utterance received, to a second electronic device via a communication circuit of the first electronic device, and receiving a response related to the user's utterance from the second electronic device in response to the transmission and providing the received response.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that certain embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Certain embodiments as set forth herein may be implemented as software (e.g., the program 1840) including one or more instructions that are stored in a storage medium (e.g., internal memory 1836 or external memory 1838) that is readable by a machine (e.g., the electronic device 1801). For example, a processor (e.g., the processor 1820) of the machine (e.g., the electronic device 1801) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

According to an embodiment, electronic devices (e.g., the user terminal 100 of FIG. 1 or the intelligent server 200 of FIG. 1) as described herein are not limited to the above-described devices. As used herein, the term "user" may denote a human or another device (e.g., an artificial intelligent electronic device) using the electronic device.

As is apparent from the foregoing description, according to certain embodiments, an electronic device (e.g., an intelligent server) may provide a task consistent with the user's intent although the user's utterance contains a plurality of words corresponding to a particular parameter (e.g., kind of food).

According to certain embodiments, an electronic device (e.g., an intelligent server) may notify the user of the missing of a mandatory word necessary to provide a task requested through the user's utterance or to identify the user's intent by processing the user's utterance in semantic units.

The effects set forth herein are not limited thereto, and it is apparent to one of ordinary skill in the art that various effects may be disclosed herein.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. An electronic device, comprising:
   a communication circuit;
   an input module including a microphone;
   at least one processor; and
   a memory operatively connected with the at least one processor the input module, and the communication circuit, wherein the memory stores instructions configured to enable the at least one processor to:
   receive, via the microphone, a first utterance and a second utterance of a user, the first utterance different from the second utterance,
   wherein the second utterance of the user includes a plurality of first words to be processed by the at least one processor as being a first parameter, a plurality of second words to be processed by the at least one processor as being a second parameter which has a predesignated relevance with the first parameter, and at least one third word to be processed by the at least one processor as being a third parameter which is irrelevant to the first parameter and the second parameter,
   execute a function according to the first utterance including wake-up of the electronic device,
   transmit information indicated by the second utterance to an external electronic device via the communication circuit,
   receive response information related to the second utterance from the external electronic device, and
   display a user interface including display of at least some of the response information.

2. The electronic device of claim 1, wherein the second utterance of the user includes at least one first word set including the plurality of words with predesignated relevance and further includes at least one word irrelevant to the first word set, and wherein the external electronic device includes an instruction configured to distinguish the first word set from the at least one word in different semantic groups.

3. The electronic device of claim 1, wherein the second utterance of the user includes at least one first word set including a plurality of words, the plurality of words included in the first word set include at least two or more words differing from each other and corresponding to a predesignated parameter, and wherein the external electronic device includes an instruction configured to set the at least two or more words as words included in a single semantic group.

4. The electronic device of claim 3, wherein the external electronic device includes another instruction configured to determine whether the second utterance of the user includes a plurality of words corresponding to a predesignated parameter.

5. The electronic device of claim 1, wherein the second utterance of the user includes at least one first word set including a plurality of words with predesignated relevance and a second word set including a plurality of words differing from the plurality of words and having the predesignated relevance, and wherein the external electronic device includes an instruction configured to distinguish the first word set and the second word set in different semantic groups.

6. The electronic device of claim 5, wherein at least one of a plurality of words included in the first word set and at least one of a plurality of words included in the second word set correspond to a same parameter.

7. The electronic device of claim 3, wherein the predesignated parameter includes the first parameter, the second parameter, and the third parameter which have a hierarchy, and wherein a plurality of words included in the first word set include words each of which corresponds to at least two or more of the first parameter, the second parameter, and the third parameter.

8. The electronic device of claim 1, wherein the predesignated relevance includes at least one of a linking relation, a logical operation relation, and an order relation between parameters each of which corresponds to a respective one of the plurality of words, and
   wherein the second user utterance is determined to include a plurality of keywords indicating predesignated objects, and counts respectively associated with each of the keywords, and the display of the response information includes categorical display of text representative of each predesignated object and respective counts for each predesignated object.

9. The electronic device of claim 8, wherein the external electronic device includes an instruction configured to determine whether the predesignated relevance is at least one of the linking relation, the logical operation relation, and the order relation, and when the predesignated relevance is the logical operation relation, compare sizes of at least two or more numbers included in the user's utterance, and determine a parameter for each of the numbers based on a result of the comparison.

10. The electronic device of claim 8, wherein the external electronic device includes an instruction configured to determine whether the predesignated relevance is at least one of the linking relation, the logical operation relation, or the order relation, and when the predesignated relevance is the order relation, sort words selected from among a plurality of words included in the user's utterance in a predesignated order, and map the selected words to a predesignated parameter.

11. The electronic device of claim 10, wherein the external electronic device includes another instruction configured to convert the words selected from among the plurality of words included in the user's utterance into standard words based on a similar word list stored in the external electronic device.

12. The electronic device of claim 1, wherein the external electronic device includes an instruction configured to, when the user's utterance includes a first utterance and a second utterance, map at least one word selected from the first utterance to at least one of parameters determined according to a user's intent of the second utterance, and wherein the at least one word selected from the first utterance is not included in the second utterance.

13. A method in an electronic device, comprising:
receiving, via a microphone, a first user utterance and a second utterance of a user, the first utterance different from the second utterance, wherein the second utterance of the user includes a plurality of first words to be processed by the at least one processor as being a first parameter, a plurality of second words to be processed by the at least one processor as being a second parameter which has a predesignated relevance with the first parameter, and at least one third word to be processed by the at least one processor as being a third parameter which is irrelevant to the first parameter and the second parameter;
executing, by at least one processor, a function according to the first utterance including wake-up of the electronic device;
transmitting, via a communication circuit, information indicated by the second utterance to an external electronic device;
receiving response information related to the second utterance from the external electronic device; and
displaying, on a display, a user interface including display of at least some of the response information.

14. The method of claim 13, wherein the second utterance of the user includes at least one first word set including the plurality of words with predesignated relevance and further includes at least one word irrelevant to the first word set, and wherein the method further comprises enabling the external electronic device to distinguish the first word set and the at least one word in different semantic groups.

15. The method of claim 13, wherein the second utterance of the user includes at least one first word set including a plurality of words, the plurality of words included in the first word set include at least two or more words differing from each other and corresponding to a predesignated parameter, and wherein the method further comprises enabling the external electronic device to set the at least two or more words as words included in a single semantic group.

16. The method of claim 13, wherein the second utterance of the user includes at least one first word set including a plurality of words with predesignated relevance and a second word set including a plurality of words differing from the plurality of words and having the predesignated relevance, and wherein the method further comprises enabling the external electronic device to distinguish the first word set and the second word set in different semantic groups.

17. The method of claim 15, wherein the predesignated parameter includes the first parameter, the second parameter, and the third parameter which have a hierarchy, and wherein a plurality of words included in the first word set include words each of which corresponds to at least two or more of the first parameter, the second parameter, and the third parameter.

18. The method of claim 13, wherein the predesignated relevance includes at least one of a linking relation, a logical operation relation, and an order relation between parameters each of which corresponds to a respective one of the plurality of words.

19. The method of claim 18, further comprising enabling the external electronic device to determine whether the predesignated relevance is at least one of the linking relation, the logical operation relation, or the order relation and, when the predesignated relevance is the logical operation relation, compare sizes of at least two or more numbers included in the user's utterance, and determine a parameter for each of the numbers based on a result of the comparison.

20. A non-transitory computer-readable recording medium storing instructions configured to perform at least one operation by a processor, the at least one operation comprising:
receiving, via a microphone, a first user utterance and a second utterance of a user, the first utterance different from the second utterance, wherein the second utterance of the user includes a plurality of first words to be processed by the at least one processor as being a first parameter, a plurality of second words to be processed by the at least one processor as being a second parameter which has a predesignated relevance with the first parameter, and at least one third word to be processed by the at least one processor as being a third parameter which is irrelevant to the first parameter and the second parameter;
executing a function according to the first utterance including wake-up of an electronic device;
transmitting, via a communication circuit, information indicated by the second utterance to an external electronic device via a communication circuit of the electronic device;
receiving response information related to the second utterance from the external electronic device; and
displaying, on a display, a user interface including display of at least some of the response information.

* * * * *